(12) United States Patent
Feltham

(10) Patent No.: US 11,794,568 B2
(45) Date of Patent: Oct. 24, 2023

(54) INDEPENDENT RADIATOR AND CONDENSER CONTROL

(71) Applicant: Rivian IP Holdings, LLC, Plymouth, MI (US)

(72) Inventor: Graham Lloyd Feltham, Garden City, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/353,055

(22) Filed: Jun. 21, 2021

(65) Prior Publication Data
US 2022/0402352 A1    Dec. 22, 2022

(51) Int. Cl.
   *B60K 11/08*   (2006.01)
   *B60K 11/04*   (2006.01)
   *B60H 1/00*    (2006.01)

(52) U.S. Cl.
   CPC .......... *B60K 11/085* (2013.01); *B60K 11/04* (2013.01); *B60H 1/00321* (2013.01); *B60H 1/00735* (2013.01); *B60H 1/00878* (2013.01)

(58) Field of Classification Search
   CPC .. B60K 11/085; B60K 11/04; B60H 1/00321; B60H 1/00735; B60H 1/00878
   See application file for complete search history.

(56) References Cited

U.S. PATENT DOCUMENTS

| | | | | |
|---|---|---|---|---|
| 5,205,484 A | * | 4/1993 | Susa | F01P 7/12 |
| | | | | 165/294 |
| 5,269,264 A | * | 12/1993 | Weinhold | F01P 11/10 |
| | | | | 123/41.05 |
| 6,823,935 B1 | * | 11/2004 | Arold | B60H 1/00842 |
| | | | | 165/203 |
| 10,252,611 B2 | * | 4/2019 | Errick | B60K 11/085 |
| 10,479,168 B2 | * | 11/2019 | Running | B60H 1/00764 |
| 10,704,456 B2 | * | 7/2020 | Dziubinschi | F01P 11/10 |
| 2001/0004090 A1 | * | 6/2001 | Yamashita | B60H 1/00764 |
| | | | | 237/12 |
| 2011/0308763 A1 | * | 12/2011 | Charnesky | B60H 1/3229 |
| | | | | 165/41 |
| 2013/0284419 A1 | * | 10/2013 | Collins | B60K 11/04 |
| | | | | 165/104.11 |
| 2015/0343878 A1 | * | 12/2015 | Pietsch | B60H 1/005 |
| | | | | 165/42 |
| 2017/0326966 A1 | * | 11/2017 | Marcant | F01P 7/10 |
| 2019/0143921 A1 | * | 5/2019 | Tian | F28F 27/02 |
| | | | | 180/68.1 |
| 2021/0155074 A1 | * | 5/2021 | Vaddiraju | B60K 11/02 |

* cited by examiner

*Primary Examiner* — Kurt Philip Liethen
(74) *Attorney, Agent, or Firm* — Clements Bernard Walker; Christopher L. Bernard

(57) ABSTRACT

Disclosed embodiments include apparatuses, vehicles, machines, equipment, and methods for selectively allocating airflow between different heat exchangers. In an illustrative embodiment, an apparatus includes a first heat exchanger configured to dissipate heat from at least one first system. A second heat exchanger is configured to dissipate heat from at least one second system. An airflow controller is configured to receive an intake airflow and to direct an output airflow to selectively direct at least a portion of the output airflow to either or both of the first and second heat exchangers.

23 Claims, 17 Drawing Sheets

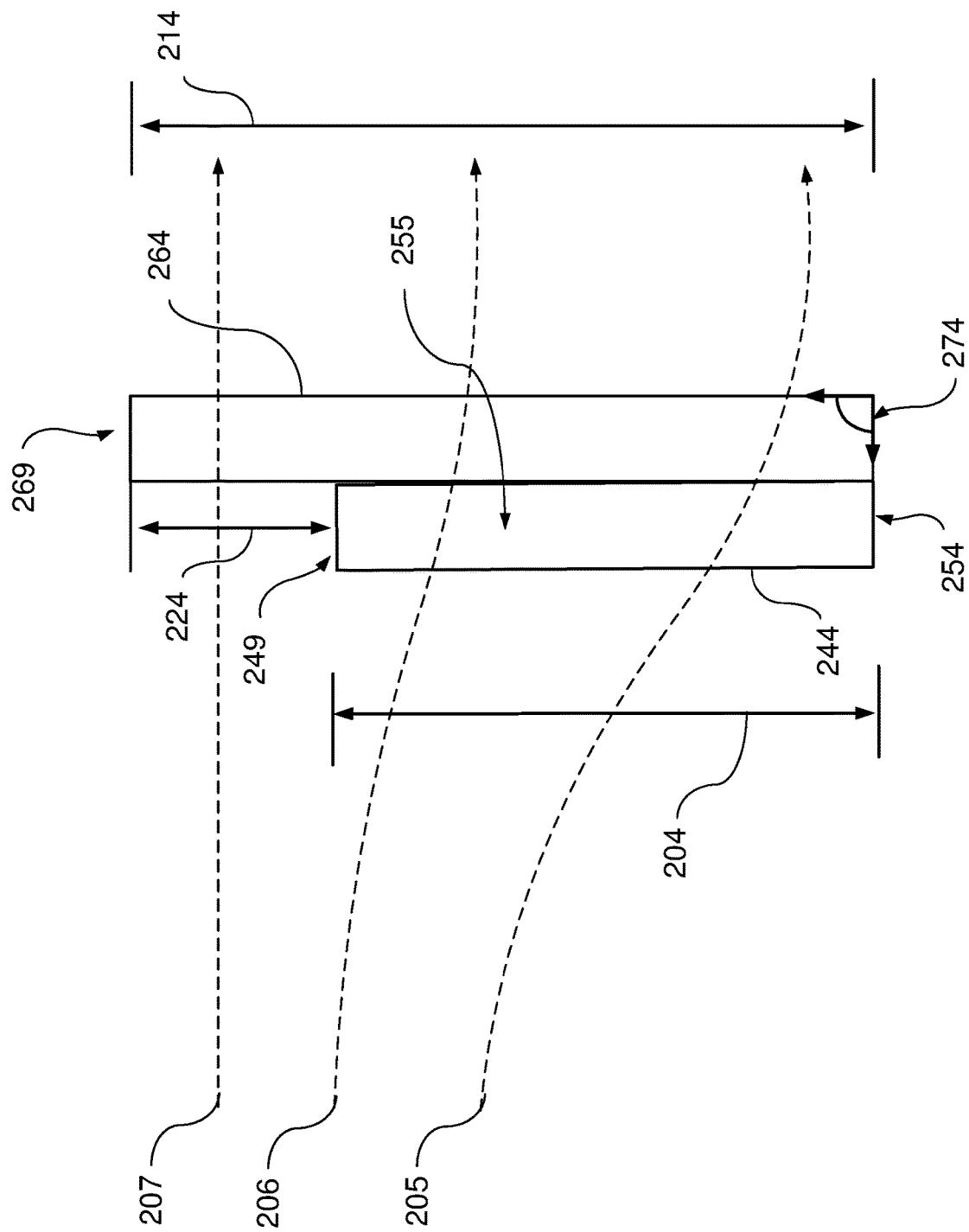

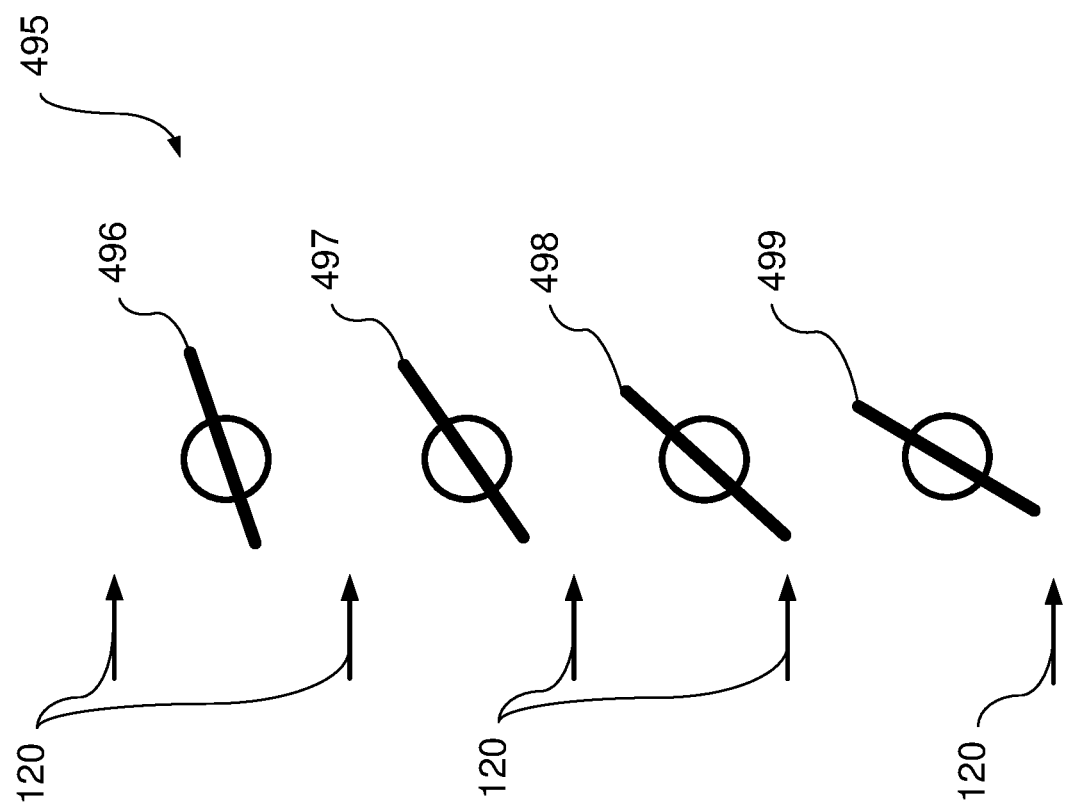

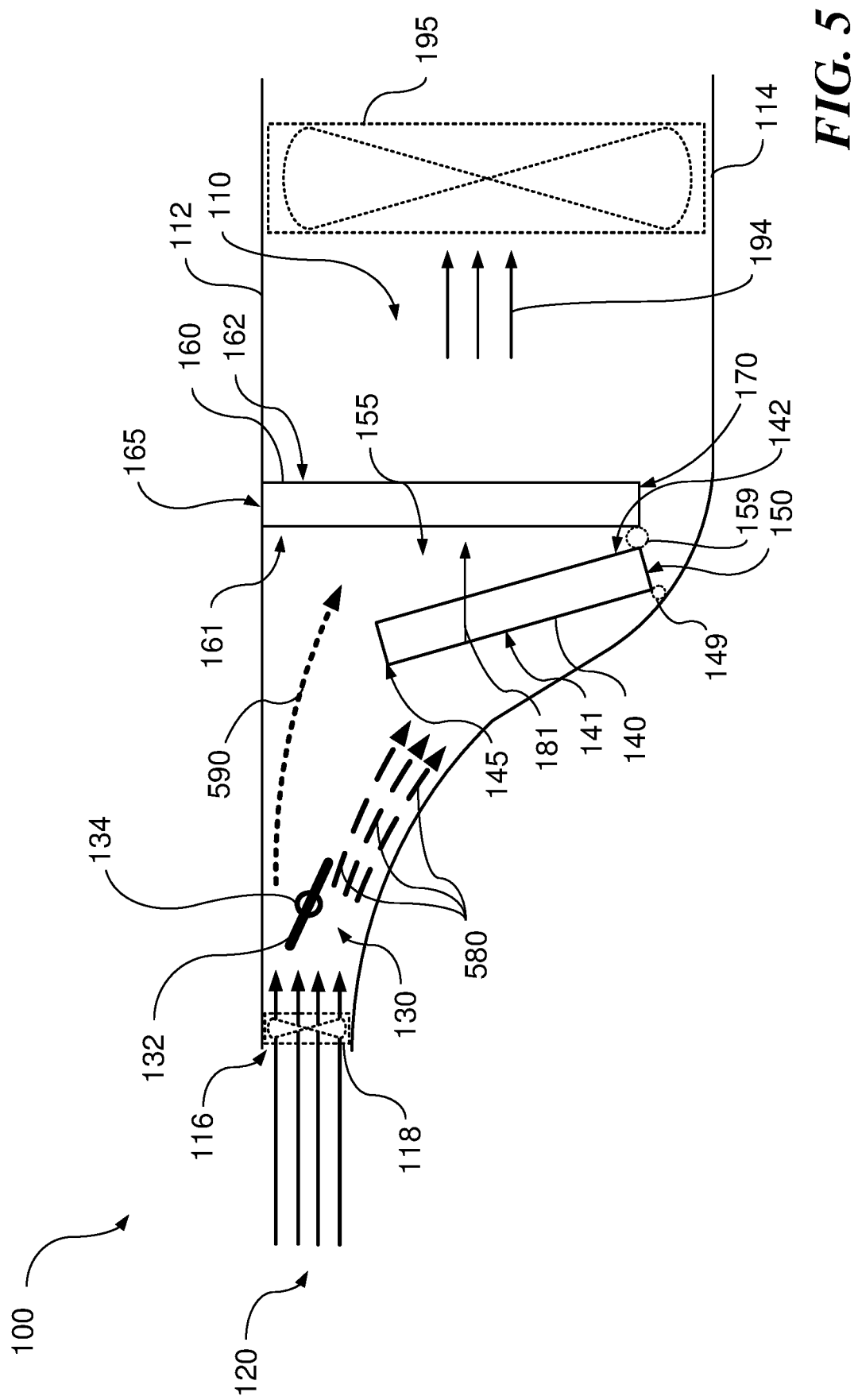

INDEPENDENT RADIATOR AND CONDENSER CONTROL

INTRODUCTION

The present disclosure relates to managing airflow across a radiator and a condenser in a vehicle.

The statements in this section merely provide background information related to the present disclosure and may not constitute prior art.

In many powered vehicles, it is important to cool various systems to maintain or enhance operation of those system. For example, in vehicles powered by internal combustion engines, radiators and/or condensers are used to dissipate heat from engines or from air conditioners and air-chargers, respectively. In some vehicles, radiators may be used to dissipate heat generated by a powertrain and other electrical components and condensers may be used to dissipate heat from air conditioners or chillers used to cool powertrain systems.

BRIEF SUMMARY

Disclosed embodiments include apparatuses, vehicles, and methods for heat exchangers and a control shutter to selectively control the airflow over each of the heat exchangers.

In an illustrative embodiment, an apparatus includes a first heat exchanger configured to dissipate heat from at least one first system. A second heat exchanger is configured to dissipate heat from at least one second system. An airflow controller is configured to receive an intake airflow and to direct an output airflow to selectively direct the output airflow either or both of the first and second heat exchangers.

In another illustrative embodiment, a vehicle includes a vehicle body. A cabin is incorporated in the vehicle body. A drive system is supported by the vehicle body and is configured to control one or more wheels of the vehicle. A drive system compartment is incorporated in the vehicle body. A heat exchange system is disposed in the drive system compartment. The heat exchange system includes a first heat exchanger configured to dissipate heat from the drive system. A second heat exchanger is configured to dissipate heat from an additional system aboard the vehicle. An airflow controller is configured to receive an intake airflow and to direct an output airflow to selectively direct at least a portion of the output airflow to either or both of the first and second heat exchangers.

In a further illustrative embodiment, a method includes disposing a first heat exchanger in a drive system compartment of a vehicle, where the first heat exchanger is configured to dissipate heat from at least one first system. A second heat exchanger is disposed in the drive system compartment of the vehicle, where the second heat exchanger is configured to dissipate heat from at least one second system. An intake airflow is received. The intake airflow is selectively redirected to direct an output airflow to either or both of the first and second heat exchanger.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 2A-2D are side plan views of different configurations of the heat exchangers of FIG. 1;

FIGS. 4A-4I are schematic views of position modes for the airflow controller of FIG. 1 employing multiple control shutters;

FIGS. 5 and 6 are side plan views of the apparatus of FIG. 1 configured in different positions to address different heat dissipation situations;

DETAILED DESCRIPTION

The following description is merely illustrative in nature and is not intended to limit the present disclosure, application, or uses. It will be noted that the first digit of the reference numbers corresponds to figure number in which the element first appears.

The following description explains, by way of illustration only and not of limitation, various embodiments of apparatuses, vehicles, machines, engines, and methods for selectively allocating airflow between different heat exchangers.

By way of a non-limiting introduction and overview, in various embodiments, a first heat exchanger, such as a radiator, is positioned at a first position in a drive system compartment of a vehicle or another compartment. A second heat exchanger, such as a condenser, is positioned at a second position in the drive system compartment. An airflow controller is configured to receive an intake airflow and to direct an output airflow to selectively direct, allocate, guide, control, and/or steer the output airflow between the first and second heat exchangers. As further described below, for example, the first heat exchanger may include a radiator used to cool a drive system. The second heat exchanger may include a condenser used to support operation of a cabin air conditioning system and battery cooling system. When the vehicle is being driven at high speeds, uphill, and/or moving a heavy load to as to tax or place restraints on the drive system, the airflow controller may direct more of the airflow toward the radiator to enhance cooling of the radiator to help dissipate heat from the drive system. On the other hand, when the vehicle is stationary and the drive system is not being restrained or taxed, the airflow controller may direct more or all of the airflow to the condenser to facilitate operation of the cabin air conditioner and battery chiller. The airflow controller may adjust allocation of the airflow to serve the relative the cooling needs of the heat exchangers in whatever situation the vehicle operates.

Now that a general overview has been given, details of various embodiments will be explained by way of non-limiting examples given by way of illustration only and not of limitation.

Figure 1:
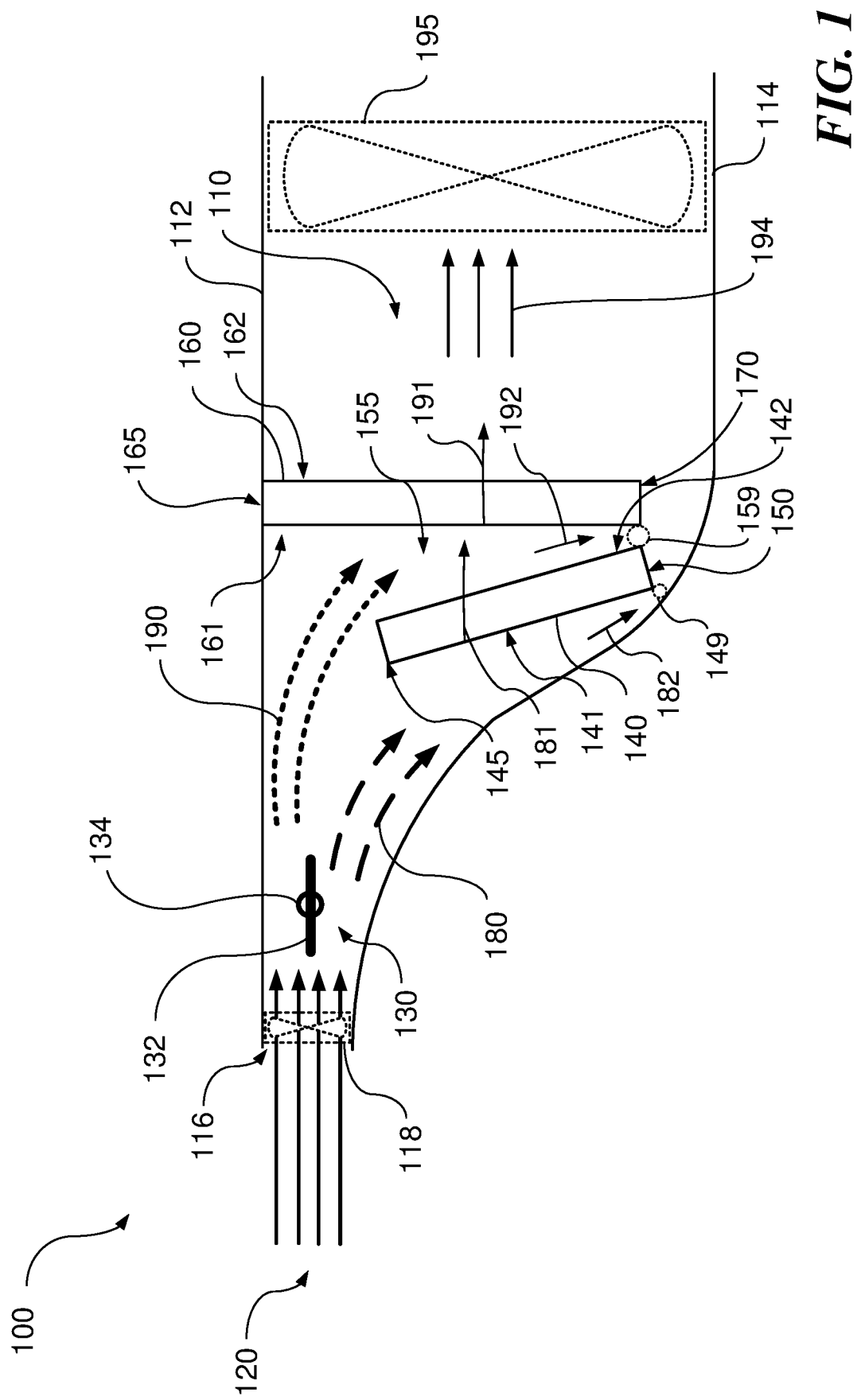
FIG. 1 is a side plan view of an illustrative apparatus including an airflow controller to allocate airflow between heat exchangers.

Referring to FIG. 1, an apparatus 100 is positioned in a compartment 110 configured to receive a flow of air. The compartment 110 may include a motor or engine compartment of a vehicle (not shown in FIG. 1). When the compartment 110 is part of a vehicle, the compartment 110 may be at a front, side, rear, or other position of the vehicle as long as the compartment is configured to receive a flow of air. The compartment may be part of an electrically-powered vehicle, solar-powered vehicle, an internal combustion engine-powered vehicle, or a hybrid-powered vehicle. The compartment 110 may include an upper wall 112, a lower wall 114, and other walls and/or surfaces. The compartment 110 includes an airflow source 116 that is configured to receive an intake airflow 120. In various embodiments relating to vehicles (not shown in FIG. 1), the airflow source 116 may include ram air collected via a vehicle grill or an air scoop that is positioned so that the intake airflow 120 is induced when the vehicle is moving. In various embodiments, the apparatus 100 may include one or more intake fans 118 positioned at or adjacent to the airflow source 116 to provide or motivate the intake airflow 120. In addition to or instead of the one or more intake fans 118, one or more outlet fans 195 may be positioned at an opposite end of the compartment 110 to draw air out of the compartment 110 after the air has passed over one or both of the heat exchangers 140 and 160, as further described below. In various embodiments, the intake fan 118 may be used to draw ambient air into the compartment 110 and/or the outlet fan 195 may be used to draw ambient air through the compartment 110 when the vehicle is stationary or moving slowly and/or the intake fan 118 and/or the outlet fan 195 may be used to accelerate the intake airflow 120 when the vehicle is moving.

In various embodiments, the intake airflow 120 is directed and/or allocated by an airflow controller 130. In various embodiments, the airflow controller 130 includes at least one control shutter 132 that is disposed between the airflow source 116 and an interior of the compartment 110. In various embodiments, the control shutter 132 is rotatably mounted. In various embodiments, the control shutter 132 is coupled with a rotatable motivator 134, such as an electric servo motor, stepper motor, or other actuator configured to rotate to selected angular positions, that is configured to adjust an orientation of the control shutter 132, as further described below. The rotatable motivator 134 may be directly coupled to the control shutter 132 or coupled with a linkage, such as a chain, belt, or other mechanical linkage. By changing the orientation of the control shutter 132 in one or more dimensions, the intake airflow 120 is selectively directable to systems within the compartment 110, as further described below.

In an illustrative system, the apparatus includes a first heat exchanger 140 and a second heat exchanger 160. The heat exchangers 140 and 160 each might include, for example, a radiator 140 to cool fluids used to cool another system (not shown) or a condenser 160 to cool gases or liquids to cool another system (not shown). The radiator 140 may include a column radiator, a fin radiator, a serpentine radiator, a panel radiator including one or more radiator panels, or any other form of radiator. The radiator 140 may be formed of iron, steel, aluminum, copper, or any other metal or other material that conducts thermal energy. The condenser 160 may include a tube, tube-and-fin, or plate-type condenser, or any other form of condenser. In various embodiments, the first and second heat exchangers 140 and 160 both may either radiators or condensers used to cool different systems, or the system 100 also may include more than two heat exchangers or simply one of the two heat exchangers 140 and 160.

In various embodiments, both the first and second heat exchangers 140 and 160 may have generally planar bodies that include a serpentine conduit and/or a multitude of conduits through which fluids, gases, or other liquids are circulated to dissipate heat from the fluids circulated therein. However, the first heat exchanger 140 and/or the second heat exchanger 160 may include angled or curved bodies or may include any shape usable in exchanging heat with the ambient air. In various embodiments, the first heat exchanger 140 includes a first face 141 that generally faces the airflow source 116, a second face 142 facing away from the airflow source 116, an upper edge 145 extending into the compartment 110, and a lower edge 150 near the lower wall 114 of the compartment 110. Comparable to the first heat exchanger 140, the second heat exchanger 160 includes a first face 161 that generally faces the airflow source 116, a second face 162 facing away from the airflow source 116. The second heat exchanger also may include an upper edge 165 near the upper wall 112 that is near the upper wall 114 of the compartment 110 and a lower edge 170 extending into the compartment 110. A few illustrative examples of some of the possible arrangements of the first heat exchanger 140 and the second heat exchanger 160 are described further below with reference to FIGS. 2A-2D.

The airflow controller 130 may be used to direct and allocate the intake airflow 120 as output airflows to at least one of the first heat exchanger 140 and the second heat exchanger 160, possibly balancing between the first heat exchanger 140 and the second heat exchanger 160 to facilitate cooling of the heat exchangers 140 and 160 and the systems with which each is associated. For illustration, changing the orientation of the control shutter 132 may control portions of the intake airflow 120 directed as a first output airflow 180 toward the first face 141 of the first heat exchanger 140. Similarly, changing the orientation of the control shutter 132 may control portions of the intake airflow 120 directed as a second output airflow 190 toward the first face 161 of the second heat exchanger 160 and/or into a space 155 between the second face 142 of the first heat exchanger 140 and the first face 161 of the second heat exchanger 160.

As further described below, rotation of the control shutter 132 may direct or allocate more of the intake airflow 120 toward one of the heat exchangers 140 and 160 in response to when one of the heat exchangers 140 and 160 may reach a threshold temperature, for example, have an increased need for heat dissipation or allocate less of the intake airflow 120 toward one of the heat exchangers 140 and 160 in response to when one of the heat exchangers 140 and 160 may have reduced need for heat dissipation, as further described below.

It will be appreciated that at least a portion of the first output airflow 180 may result in a first passthrough airflow 181 that passes through the first heat exchanger 140 and flows toward the second heat exchanger 160. A portion of the first output airflow 180 also may include a first surface airflow 182 that flows across the first face 141 of the first heat exchanger 140. However, the first surface airflow 182 may be redirected to flow through the first heat exchanger 140 by disposing the lower edge 150 of the first heat exchanger 140 against the lower wall 114 of the compartment 110 and/or by using a seal 149 to seal the lower edge 150 of the first heat exchanger 140 against the lower wall 114 of the compartment 110. A portion of the second output airflow 190 may also result in a second passthrough airflow 191 that flows through the second heat exchanger 160 and/or a second surface airflow 192 that flows along the first face 161 of the second heat exchanger 160. The second surface airflow 192 may be redirected to flow through the second heat exchanger 160, for example, by using a seal 159 to prevent the second surface airflow 192 from flowing between the lower edge 150 of the first heat exchanger 140 and the lower edge 170 of the second heat exchanger 160. It will be appreciated that arrangement of the heat exchangers 140 and 160 relative to the walls 112 and 114 of the compartment 110, potentially using seals such as the seals 149 and 159 may control the flow of air through and around the heat exchangers. An exhaust airflow 194 which has passed through or over one or more of the heat exchangers 140 and 160 may pass out of the compartment 110 through an exhaust vent (not shown).

Figure 2A:
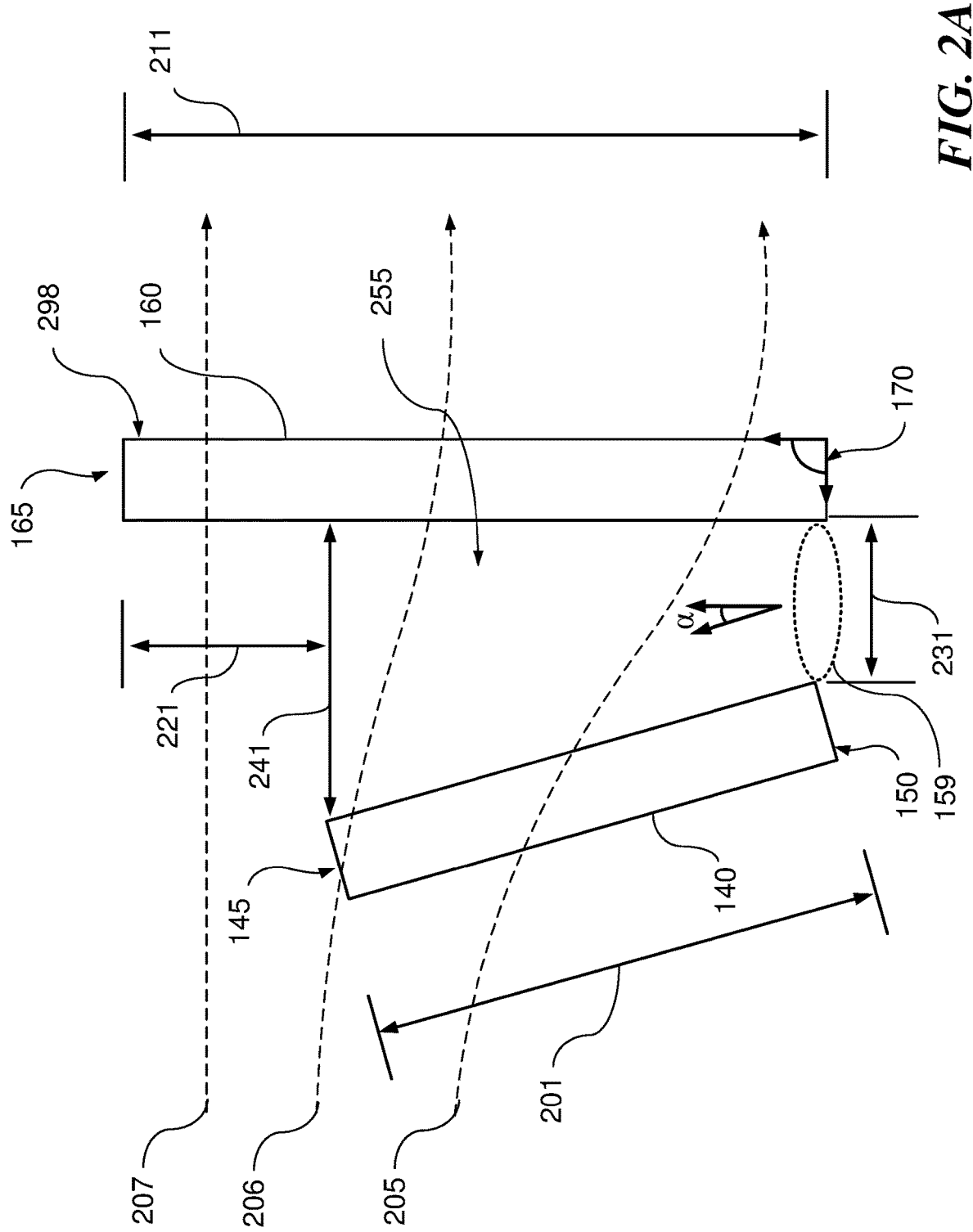

Referring additionally to FIGS. 2A-2D, the heat exchangers 140 and 160 may be positioned at different relative positions, planarly, linearly and/or angularly, to suit various applications, and the heat exchangers 140 and 160 also may be of different sizes. Referring to FIG. 2A, the heat exchangers 140 and 160 are arranged as positioned in FIG. 1. The first heat exchanger 140 may be positioned closer to the airflow source 116 (FIG. 1) than the second heat exchanger 160 by a horizontal offset 231 as measured between the lower edge 150 of the first heat exchanger 140 and the lower edge 170 of the second heat exchanger 160. The first heat exchanger 140 is disposed at an angular offset or splay angle α relative to the second heat exchanger 160, defining an angled space 255 therebetween with an upper gap 241 as measured between the upper edge 145 of the first heat exchanger 140 and the upper edge 165 of the second heat exchanger 160. In addition, the first heat exchanger 140 may have a first height 201 that is less than a second height 211 of the second heat exchanger 160, resulting in an offset 221 as measured between the upper edge 145 of the first heat exchanger 140 and the upper edge 165 of the second heat exchanger 160 where the second heat exchanger 160 may directly receive an airflow that does not pass through the first heat exchanger 140. For purposes of FIGS. 2A-2D, for reference, an airflow includes a first stream 205 that passes fully first through the first heat exchanger 140 then through the second heat exchanger 160, a second stream 206 that may pass partially through or around the first heat exchanger 140 then through the second heat exchanger 160 (or passes through both heat exchangers 140 and 160 in the case of FIG. 2D), and a third stream 208 that flows directly to and through the second heat exchanger 160.

Figure 2B:
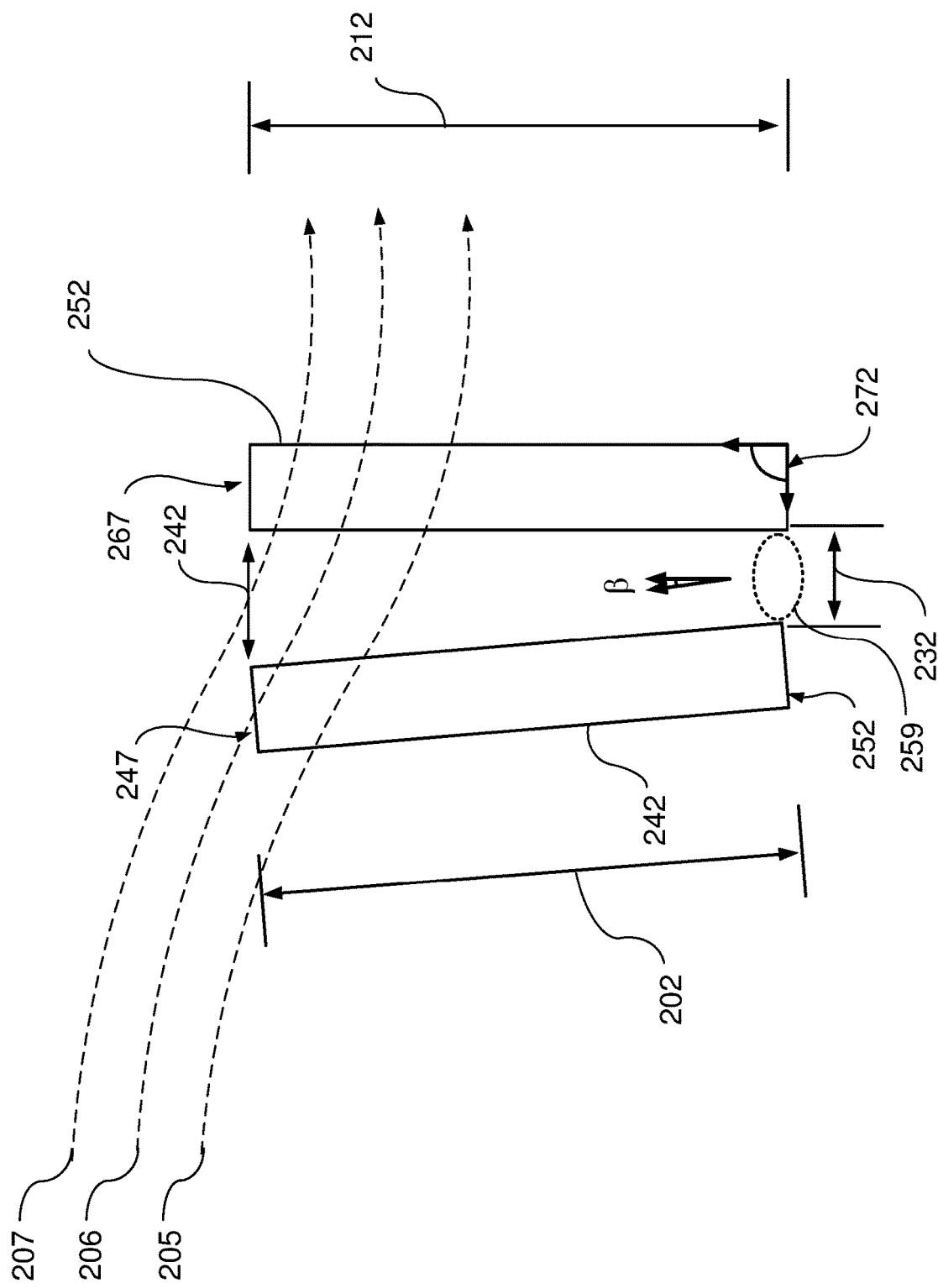
Figure 2C:
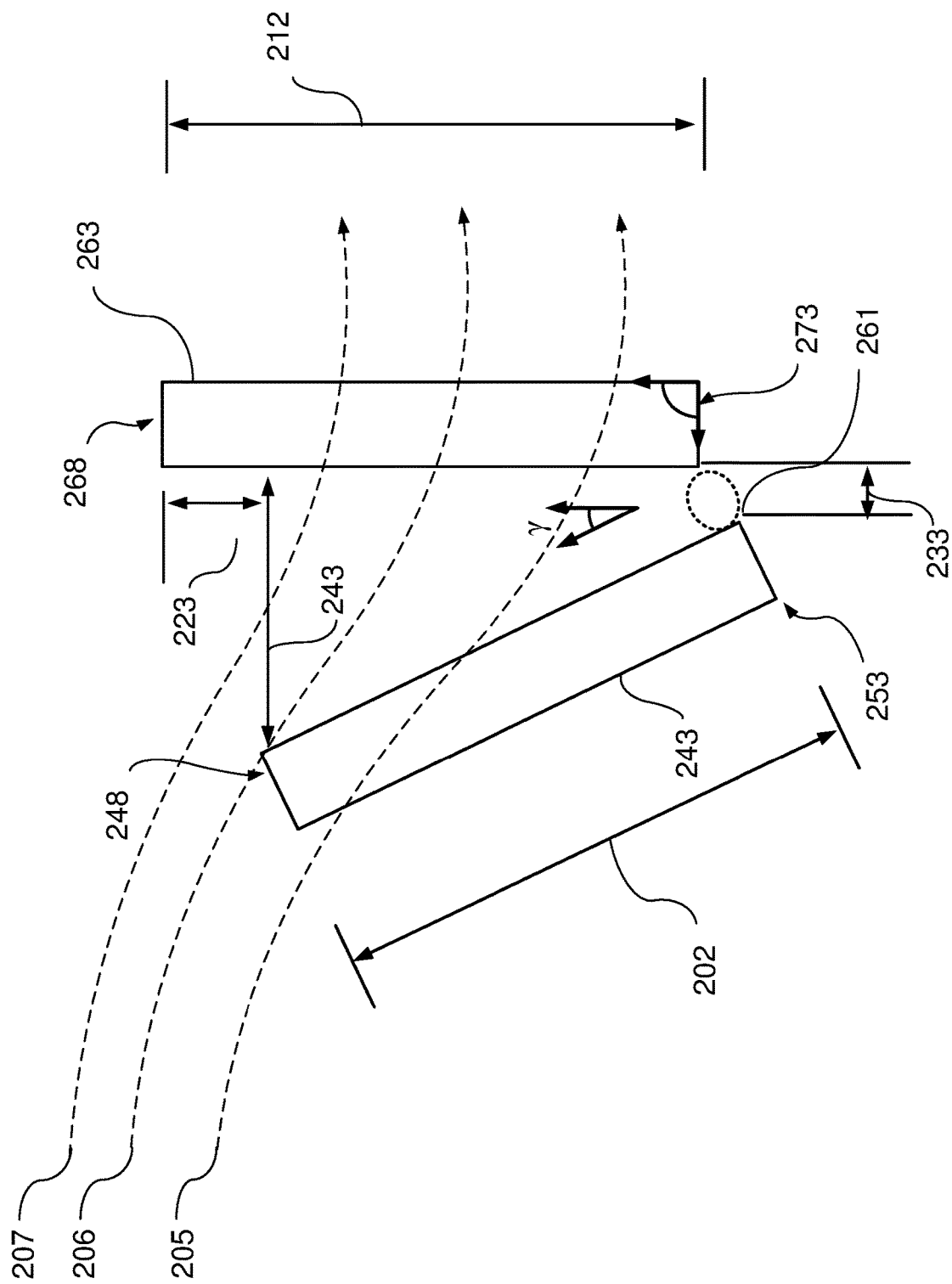

Referring additionally to FIGS. 2B-2D, it will be appreciated that heat exchangers 140 and 160 may be sized and positioned differently than described with reference to FIGS. 1 and 2A to address different cooling requirements and/or to accommodate different design and/or space considerations. Referring additionally to FIG. 2B, in various embodiments, a first heat exchanger 242 and a second heat exchanger 252 have approximately equal heights 202 and 212, respectively. (It will be appreciated that, although not shown, in various embodiments, the first heat exchanger 242 also may have a first height 202 that is greater than a second height 212 of the second heat exchanger 252.) As a result, lower edges 252 and 272 upper edges 247 and 267 of the heat exchangers 242 and 252, respectively, may be at approximately the same vertical positions. The heat exchangers 242 and 262 also may be positioned more closely together. The first heat exchanger 242 and the second heat exchanger may be separated by a smaller horizontal offset 232 (as compared to the configuration of FIG. 2A) as measured between the lower edge 252 of the first heat exchanger 242 and the lower edge 272 of the second heat exchanger 262. The first heat exchanger 242 also may be disposed at an angular offset or splay angle β that is less than the angular offset α of FIG. 2A relative to the second heat exchanger 262 and with a smaller upper gap 242 as measured between the upper edge 247 of the first heat exchanger 242 and the upper edge 267 of the second heat exchanger 262. In this configuration, the three streams 205-207 still may be directed to pass through the first heat exchanger 242 then through the second heat exchanger 262, partially through or around the first heat exchanger 242 then through the second heat exchanger 262, and directly to and through the second heat exchanger 262, respectively. With a different configuration of the heat exchangers 242 and 262, the heat exchangers 242 and 262 may be positioned relative to the airflow source 116 and/or the airflow controller 130 (FIG. 1) may be adapted so that the streams 205-207 are received as desired between the heat exchangers 242 and 262.

Referring additionally to FIG. 2C, in various embodiments, the heat exchangers 242 and 263 also may have equal heights 202 and 212, respectively, but offset from each other in a vertical dimension. As a result, lower edges 253 and 273 and upper edges 248 and 268 of the heat exchangers 243 and 253, respectively, are separated by a vertical offset 223. (It will be appreciated that, although not shown, in various embodiments, the first heat exchanger 243 could be offset at a higher position than the second heat exchanger 263.) The heat exchangers 243 and 262 also may be positioned more widely apart by being separated by a greater angular offset or splay angle γ. The horizontal offset 233 between the lower edges 253 and 273 of the heat exchangers 243 and 263 may be smaller and closed by a correspondingly smaller seal 261 between the lower edge 253 and 273 of the heat exchangers 243 and 263 and configured to account for the vertical offset 223 to seal between the lower edges 253 and 273. Again, in this configuration, the three streams 205-207 still may be directed to pass through the first heat exchanger 243 then through the second heat exchanger 263, pass partially through or around the first heat exchanger 243 then through the second heat exchanger 263, and pass directly to and through the second heat exchanger 263. Again, with a different configuration of the heat exchangers 243 and 263, the heat exchangers 243 and 263 may be positioned relative to the airflow source 116 and/or the airflow controller 130 (FIG. 1) may be adapted so that the streams 205-207 are received as desired between the heat exchangers 243 and 263.

Referring additionally to FIG. 2D, in various embodiments, the heat exchangers 244 and 264 may be aligned in parallel and situated adjacent to each other so that there is no linear offset or an angular offset or splay angle between the heat exchangers 244 and 264. In various embodiments, the first heat exchanger 244 may have a lesser first height 204 than a second height 214 of the second heat exchanger 244. As a result, between an upper edge 249 of the first heat exchanger 244 and an upper edge 269 of the second heat exchanger 264 there is an exposed portion 224 of the second heat exchanger 244. The exposed portion 224 of the second heat exchanger 264 thus may receive a flow of air that does not pass through the first heat exchanger 244. In this configuration, because the streams 205 and 206 both may be directed to pass through the first heat exchanger 242 then through the second heat exchanger 263, while the third stream 207 is directed to pass directly to and through the second heat exchanger 262 at the exposed portion 244. Because of the configuration of the heat exchangers 244 and 264, any stream directed toward the first heat exchanger 244 also will pass through the second heat exchanger 264. It will be appreciated that, in this configuration, the streams 205 and 206 may absorb some heat while passing through the first heat exchanger 244 while the third stream 207 flowing across the exposed portion 244 of the second heat exchanger 264 does not first pass through the first heat exchanger and may not absorb appreciable heat from the first heat exchanger 244.

The sizing, positioning, and offsets between heat exchangers may be determined as desired to suit different applications. For example, referring to FIG. 2A, the second heat exchanger 260 may be a condenser for an air conditioning system (not shown in FIG. 2A) having a subcool region 298 toward the upper edge 165 of the second heat exchanger 260. Providing the subcool region 298 with an unobstructed stream 207 that has not absorbed heat from the first heat exchanger 240 may enhance the efficiency of the second heat exchanger 260 and, thus, the operation of the air conditioning system. By using a second heat exchanger 260 with the height 211 to position the subcool region 298 to receive the unobstructed stream 207 may provide the desired enhancement. Correspondingly, increasing the angular offset and/or vertical offset of the heat exchanger 263 as shown in FIG. 2C also may provide the desired enhancement. Further, even if the heat exchangers 244 and 264 are positioned adjacent to each other, increasing a height of the second heat exchanger 264 also may provide the desired enhancement. It will be appreciated that the heat exchangers also could have different widths or lateral offsets (transverse to plane of FIGS. 2A-2D) also may provide an unobstructed stream of airflow to enhance cooling of one or more of the heat exchangers. Thus, the configuration of the heat exchangers, including the relative dimensions, relative linear offset, and/or relative angular offset splay angle relative to the source of airflow 120 (FIG. 1) may enhance operation of the heat exchangers and associated systems. The configuration of the heat exchangers thus may provide enhancement to operation of the heat exchangers with or without use of the airflow controller 130 (FIG. 1) as further described below.

Referring again to the example of FIG. 1, the airflow controller 130 may be configured to and operate in concert with the configuration of the heat exchangers 140 and 160 to provide desired overall heat exchanger performance for different applications. However, while the size and placement of the heat exchangers 140 and 160 may be designed and installed to accommodate the predicted range of heat exchanger considerations that may be encountered in operation, the airflow controller 130 enables the airflow to allocated between the heat exchangers 140 and 160 during operation to adjust for current and changing demands for heat exchange and dissipation for the heat exchangers 140 and 160 and the systems connected thereto.

Figure 3:
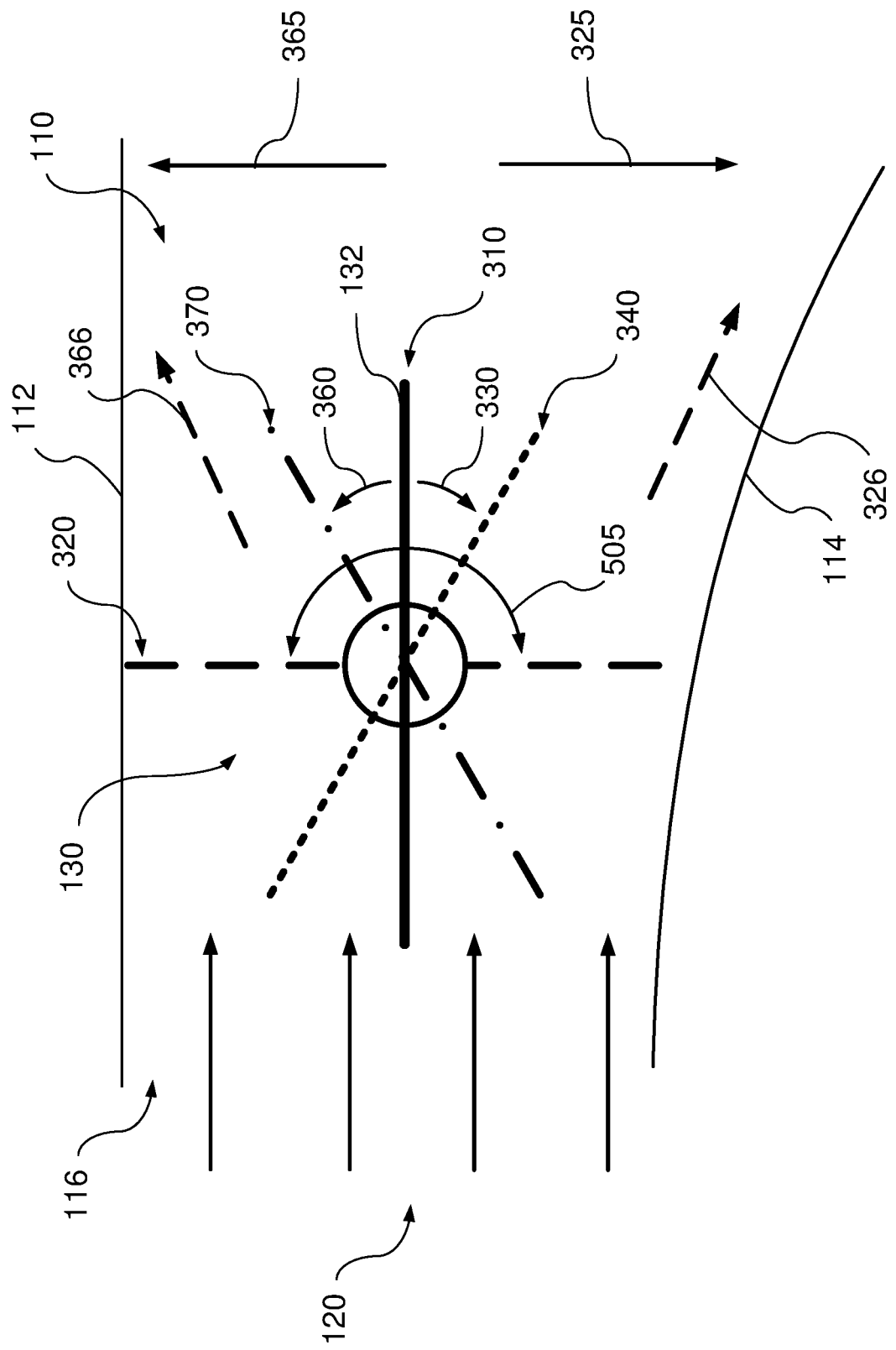
FIG. 3 is a schematic view of position modes for a control shutter of the airflow controller of FIG. 1.

Referring additionally to FIG. 3, in various embodiments, the control shutter 132 is configured to rotate through an arc 305 of 180 degrees between a horizontal position 310 (represented by a solid line) and a vertical position 320 (represented by a dashed line). Thus, in the embodiment of FIG. 3, the control shutter 132 may rotated to any position between a fully open position in the horizontal position 310, to allow the intake airflow 120 to pass with little or no obstruction, and a fully closed position in the vertical position 320 to largely or fully block the intake airflow 120.

It will be appreciated that, in a vehicle with the control shutter 132 in the fully closed, vertical position 320, the control shutter 132 blocks the intake airflow 120 from entering the vehicle. Blocking the intake airflow thereby may reduce cooling drag for the vehicle by preventing the intake airflow 120 from entering the vehicle.

In various embodiments, the control shutter 132 may not be restricted to rotating to only the horizontal position 310 or the vertical position 320. For example, and as further described below, the control shutter 132 is rotatable between the horizontal position 310 and the vertical position 320. In one configuration, the control shutter 132 is rotatable in a clockwise direction 330 from the horizontal position 310 to a first intermediate position 340 (represented by a dotted line) to direct at least a portion of the intake airflow 120 in a downward direction 325 toward the lower wall 114, as further described with reference to FIG. 5. Thus, with the control shutter 132 rotated in the clockwise direction 330 to the partial downward position 340, at least a portion of the intake airflow 120 is funneled in the downward direction 325 between the control shutter 132 and the lower wall 114, such as along a first vector 326. In another configuration, the control shutter 132 is rotatable in a counterclockwise direction 360 from the horizontal position 310 to a second intermediate position 370 (represented by a dotted and dashed line) to direct at least a portion of the intake airflow 120 in an upward direction 365 toward the upper wall 112, as further described with reference to FIG. 6. Thus, with the control shutter 132 rotated in the counterclockwise direction 360 to the partial upward position 370, at least a portion of the intake airflow 120 is funneled in the upward direction 365 between the control shutter 132 and the upper wall 112, such as along a second vector 366.

It will be appreciated that, although only two intermediate positions 340 and 370 are shown in FIG. 3, the control shutter may be rotated to any orientation. Also, although the preceding paragraph describes the control shutter 132 being rotated from the horizontal position 310, it will be appreciated that describing rotation from the horizontal position 310 was included only to provide a frame of reference. In various embodiments, the control shutter 132 may also be rotated from the vertical position 320 or any rotational orientation to any other rotational orientation; rotation of the control shutter 132 need not be initiated from or reset to the horizontal position 310 before rotating the control shutter 132 to a desired rotational position.

Referring additionally to FIGS. 4A-4I, in various embodiments, the airflow controller 130 (FIG. 1) may include any number of control shutters rotatable by a plurality of rotatable actuators, rather than a single control shutter as previously described. An array of multiple control shutters may all be arranged to rotate about parallel axes and/or may include at a periphery one or more shutters configured to rotate about transverse axes. As described with reference to FIGS. 4A-4F, the control shutters may be operated in concert to address various situations in which the airflow intake 120 is desirably directed in various ways. The following examples may include three control shutters arranged to rotate about parallel axes, but it will be appreciated that any number of control shutters may be used in various embodiments of an airflow controller 130.

Figure 4B:
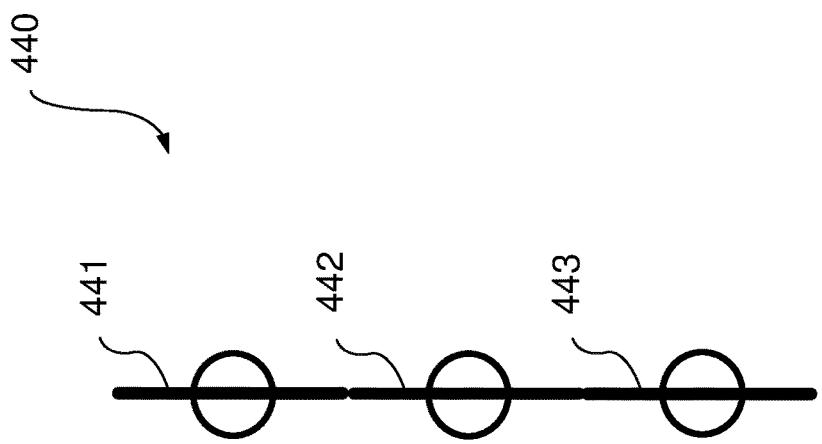
Figure 4A:
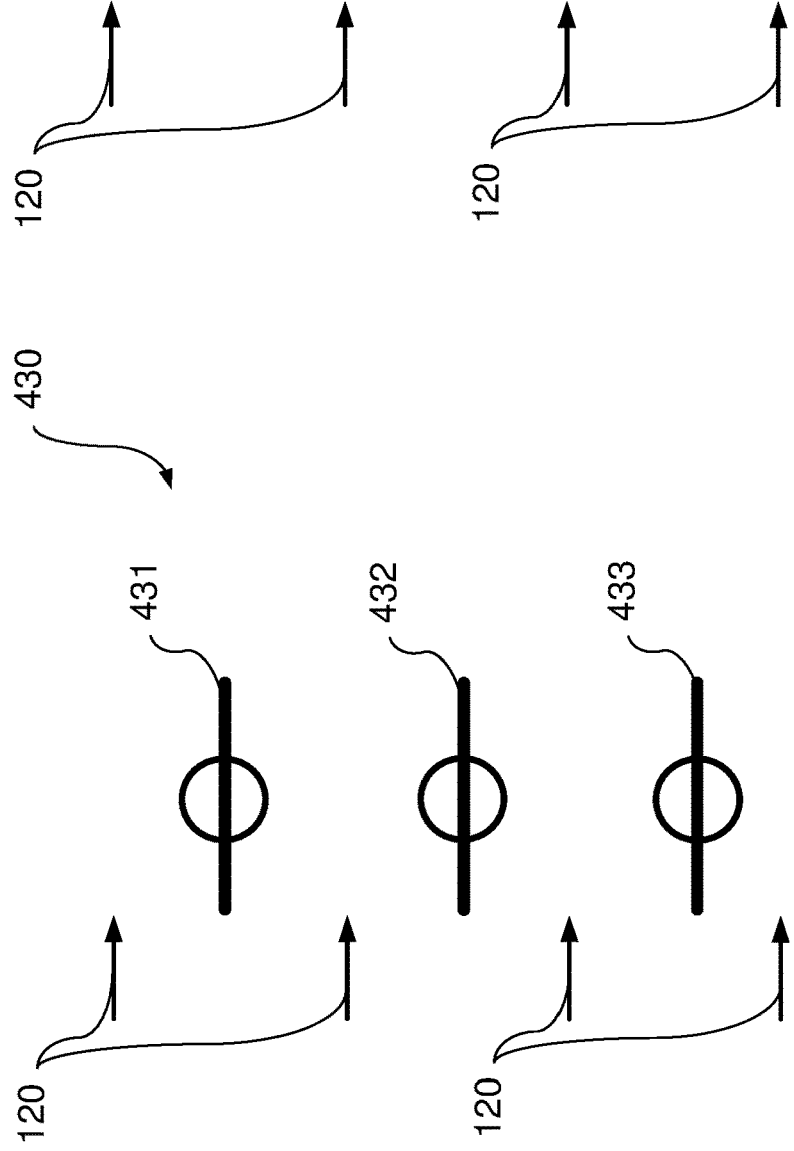
Figure 4D:
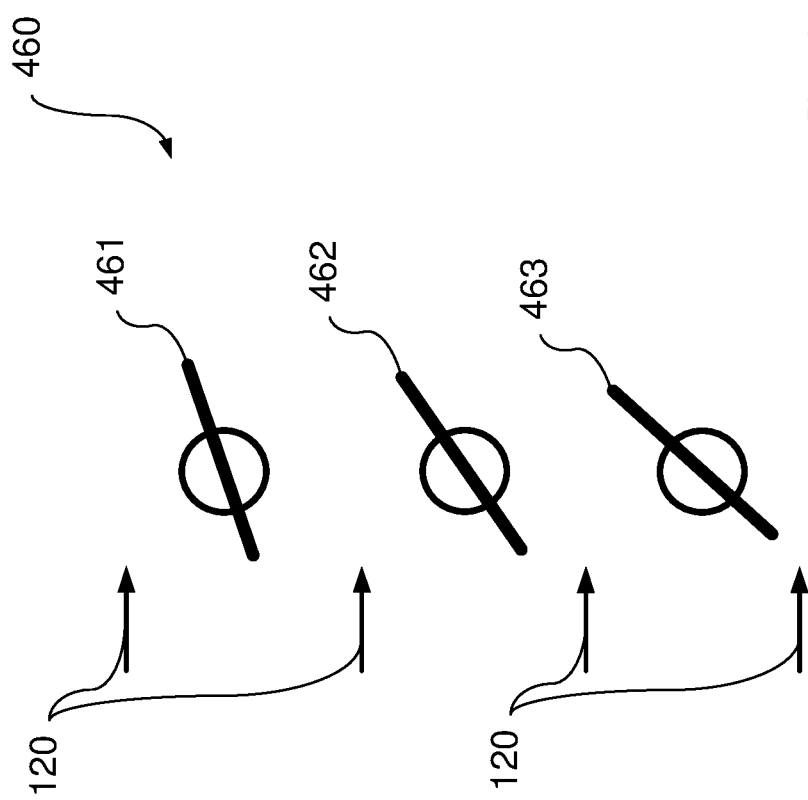

Referring to FIG. 4A-4F, configurations of airflow controllers each include three control shutters configured to rotate about parallel axes. In FIG. 4A, the control shutters 431-433 of the airflow controller 430 are disposed in an open configuration to freely admit the intake airflow 120. In FIG. 4B, the control shutters 441-444 of the airflow controller 440 are disposed in a closed configuration to at least largely block the intake airflow 120 which, as previously described, may reduce cooling drag by preventing the intake airflow from entering the vehicle (not shown) on which the airflow controller is disposed.

Figure 4C:
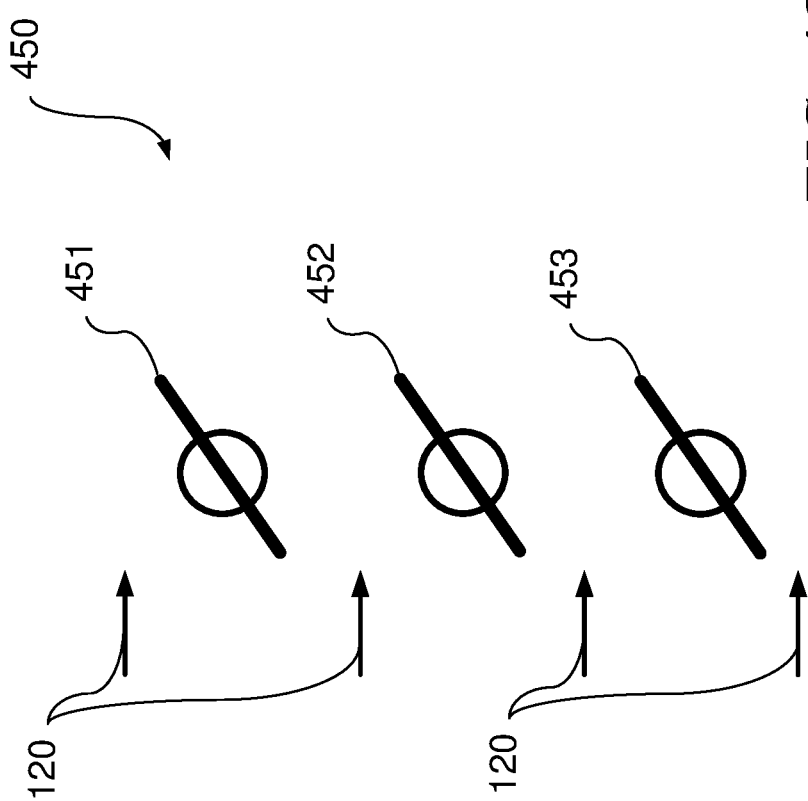

In FIG. 4C, the control shutters 451-453 of the airflow controller 450 are rotated to a position between the open and closed positions of FIGS. 4A and 4B, respectively, to direct the intake airflow in an upward direction as described with reference to FIG. 3. In the embodiment of FIG. 4C, the control shutters 451-453 may be rotated to positions in which the control shutters 451-453 are aligned in parallel. By contrast, in FIG. 4D, while the control shutters 461-463 of the airflow controller 460 are again rotated to a position between the open and closed positions of FIGS. 4A and 4B, respectively, the control shutters 461-463 are rotated to different attitudes. As a result, for example, a portion of the intake airflow 120 deflected by the control shutter 463 may be deflected to a greater degree than the portion of the intake airflow 120 deflected by the control shutter 461. Such a configuration may be used when seeking to maximize deflection of the intake airflow to a heat exchanger (not shown in FIGS. 4A-4F) arranged in an upper position behind the airflow controller 460.

Figure 4E:
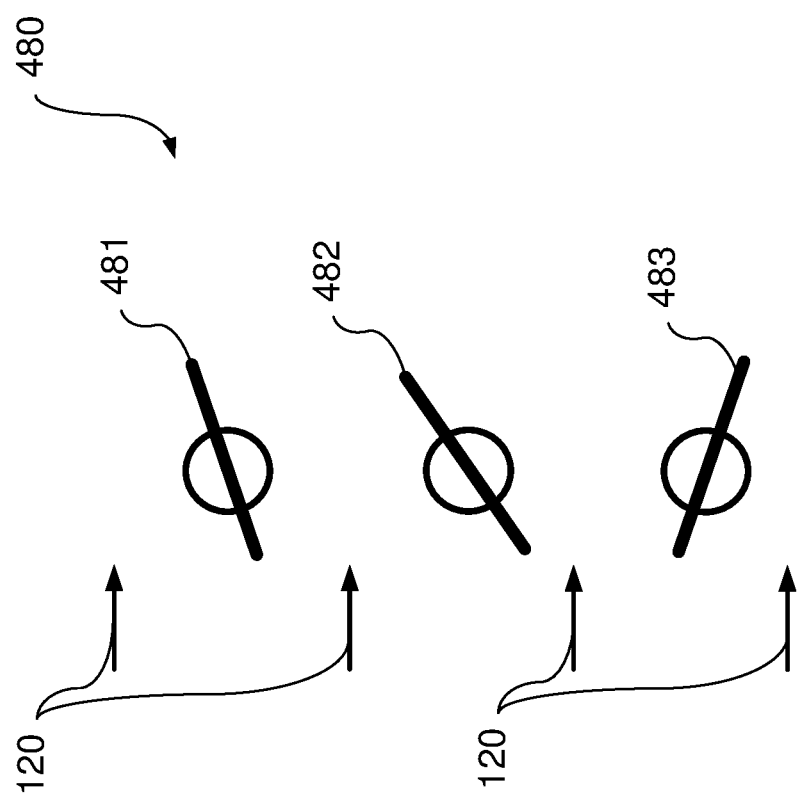
Figure 4F:
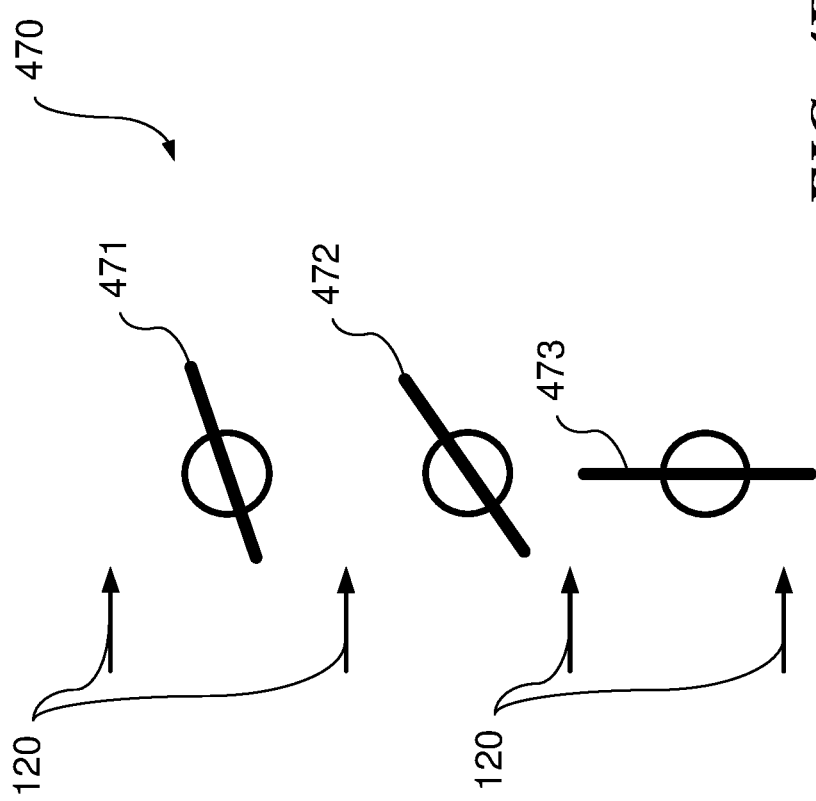

In FIG. 4E, the control shutters 471 and 472 of the airflow controller 470 are rotated to a position to deflect portions of the intake airflow 120 in an upward direction, while the control shutter 473 is rotated into a vertical, closed position. In this configuration, the control shutters 471 and 472 will direct a portion of the intake airflow 120 toward a heat exchanger in an upper position while the control shutter 473 blocks a portion of the intake airflow 120 to reduce cooling drag. In FIG. 4F, the control shutters 471 and 472 of the airflow controller 470 are again rotated to a position to deflect portions of the intake airflow 120 in an upward direction, while the control shutter 473 is rotated in an opposite sense to direct a portion of the intake airflow 120 in a downward direction, potentially to a heat exchanger in a lower position. The control shutters of the airflow controller thus may be rotated in various patterns to admit, direct, and/or block the intake airflow 120 to accommodate heat dissipation requirements of heat exchangers and/or to reduce cooling drag.

Figure 4G:
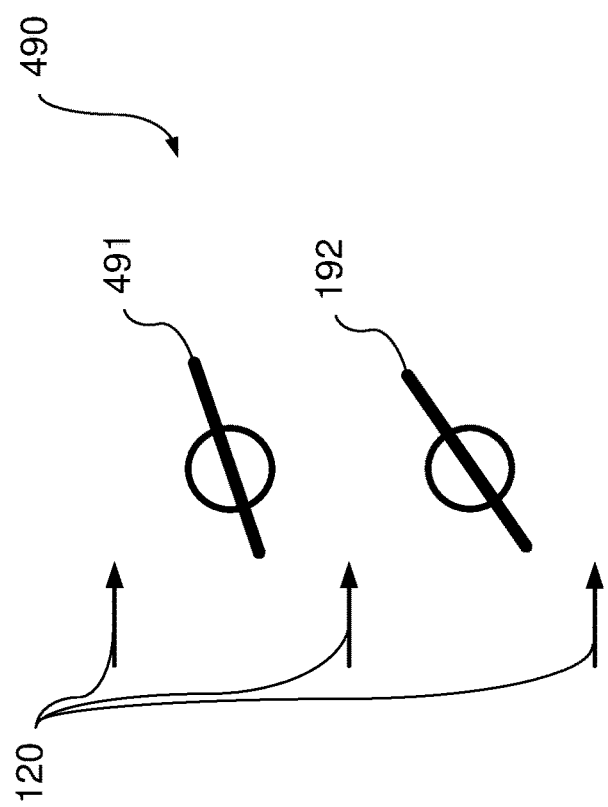
Figure 4H:
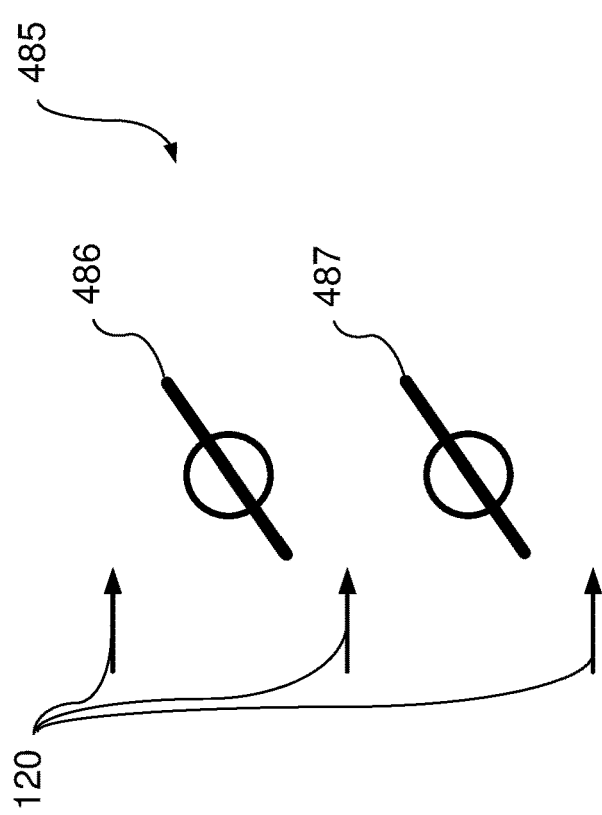

Although the examples of FIGS. 1 and 3 employ a single control shutter and the examples of FIGS. 4A-4F include three control shutters, embodiments are not restricted to using one control shutter, three control shutters, or any other number of control shutters. Referring additionally to FIGS. 4G and 4H, the airflow controllers 485 and 490 each include two control shutters 486 and 487 and 491 and 492, respectively. As in the three-shutter examples of FIGS. 4C and 4D, the control shutters 486 and 487 may be rotated to positions in which the control shutters 486 and 487 are aligned in parallel, while the control shutters 491 and 492 may be rotated to different attitudes to direct the intake airflow 120 as desired.

Referring additionally to FIG. 4I, an airflow controller 495 may include more than one, two, or three control shutters, as previously described. The airflow controller 495 may include four control shutters 496-499, or any number of control shutters. As previously described with reference to FIGS. 4C and 4G, the control shutters 496-499 may be rotated in parallel. Alternately, as previously described with reference to FIGS. 4D and 4H, the control shutters 496-499 may be rotated to different attitudes to direct the intake airflow 120 as desired.

The examples of FIGS. 4A-4I are provided by way of illustration and not limitation. The examples of FIGS. 4A-4I represent only a very small number of the combinations of numbers of control shutters and control shutter positions that may be employed.

Figure 6:
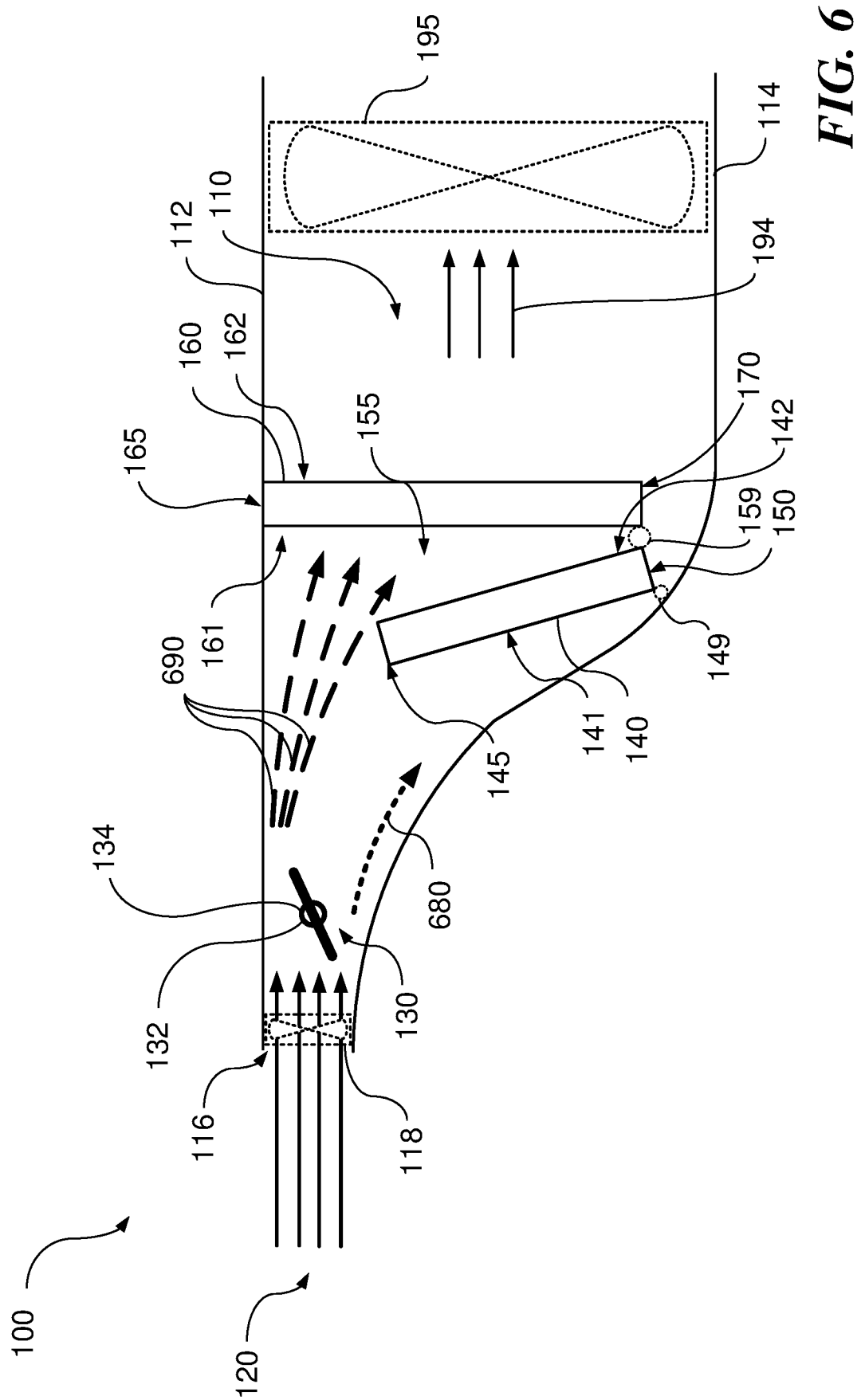

Referring to FIGS. 5 and 6, illustrations of a vehicle system in which two heat exchangers 140 and 160, as previously described with reference to FIG. 1, are used in various applications. For purposes of example, it is assumed the first heat exchanger 140 is a radiator to cool a drive system (not shown in FIGS. 5 and 6) and/or associated power systems of a vehicle, such as power inversion or conversion systems of an electrically-powered or hybrid vehicle. The second heat exchanger 160 is a condenser that is used to facilitate operation of an air conditioning system (not shown in FIGS. 5 and 6) used to cool a cabin and/or cargo area of the vehicle. The condenser 160 also may be used, for example, to facilitate battery cooling of an electrically-powered or hybrid vehicle. The airflow controller 130 of FIGS. 5 and 6 is shown with a single control shutter 132 positionable by a rotatable actuator 134, though, as described with reference to FIGS. 4A-4F, the airflow controller 130 may include multiple control shutters 132 collectively positionable by one or more rotatable actuators or separately positionable by multiple rotatable actuators.

Referring additionally to FIG. 5, the airflow controller 130 is configured to provide enhanced cooling to the drive system cooled by the first heat exchanger 140. Directing more of the intake airflow 120 to the first heat exchanger 140 to cool the drive system may be desirable when increased demands are placed on the drive system, such as during high-speed driving, towing or carrying a heavy load, racing or other aggressive driving, or off-road driving. In these situations, higher demands on the drive system may result in the drive system generating more heat and, thus, a higher demand for heat dissipation.

Accordingly, the airflow controller 130 may direct the intake airflow 120 so that a first output airflow 560, including a substantial portion or preponderance of the output airflow, is directed toward the first heat exchanger 140. The first output airflow 560 thus may impinge upon the first face 142 of the first heat exchanger 140, providing the first output airflow 580 directly to the first heat exchanger 140 where the first output airflow 580 is not also exposed to heat from the second heat exchanger 160. The first passthrough airflow 181, having absorbed some heat from the first heat exchanger 140, will pass into the gap 155 between the first heat exchanger 140 and the second heat exchanger 160 where it may impinge upon and dissipate further heat from the second face 142 of the first heat exchanger 140 and from the second heat exchanger 160. In the example of FIG. 5, a second output airflow 570, including a minority portion of the output airflow, is directed toward the second heat exchanger 160 to dissipate heat directly from the second heat exchanger 160 with a portion of the output airflow that has not already absorbed heat from the first heat exchanger 140.

Referring to FIG. 6, the airflow controller 130 is configured to provide enhanced cooling to the air conditioning system cooled by the second heat exchanger 160. Directing more of the intake airflow 120 to the second heat exchanger 160 to cool the air conditioning system may be desirable, for example, when the vehicle is not moving, stationary, and/or sitting idle. In such a situation, the drive system may not be operating at all and, thus, may generate little or no heat, while a vehicle parked in sunlight or an otherwise hot climate with the air conditioning operating may need to dissipate heat from the second heat exchanger 160 that dissipates heat from the air conditioning system and/or a battery system powering the air conditioning system. Directing more of the intake airflow 120 to the second heat exchanger 160 also may be desired in low-speed operation when, although the drive system may be generating heat, the heat dissipation needs of the first heat exchanger 140 coupled to the drive system may be relatively low as compared to the heat dissipation needs of the second heat exchanger 160. Directing more of the intake airflow 120 to the second heat exchanger 160 may be desirable when the battery system is charging.

Accordingly, the airflow controller 130 may direct the intake airflow 120 so that a third output airflow 690, including a substantial portion or preponderance of the output airflow, is directed toward the second heat exchanger 160. The third output airflow 690 thus may be directed to or impinge upon the first face 161 of the second heat exchanger 160, providing the third output airflow 690 directly to the second heat exchanger 160 where the third output airflow 690 is not also exposed to heat from the first heat exchanger 140. In the example of FIG. 6, a fourth output airflow 680, including a minority portion of the output airflow, is directed toward the first heat exchanger 140 to dissipate any heat that may be emanating therefrom. As previously mentioned, if the vehicle is operating, for example, at low speed, the drive system may generate some heat to be dissipated via the first heat exchanger 140 even if the second heat exchanger 160 has greater heat dissipation needs.

Along with the examples of FIGS. 5 and 6, it will be appreciated that the airflow controller 130 may direct the intake airflow 120 in order to allocate whatever output airflows may be appropriate for the operational mode of the vehicle.

Figure 7:
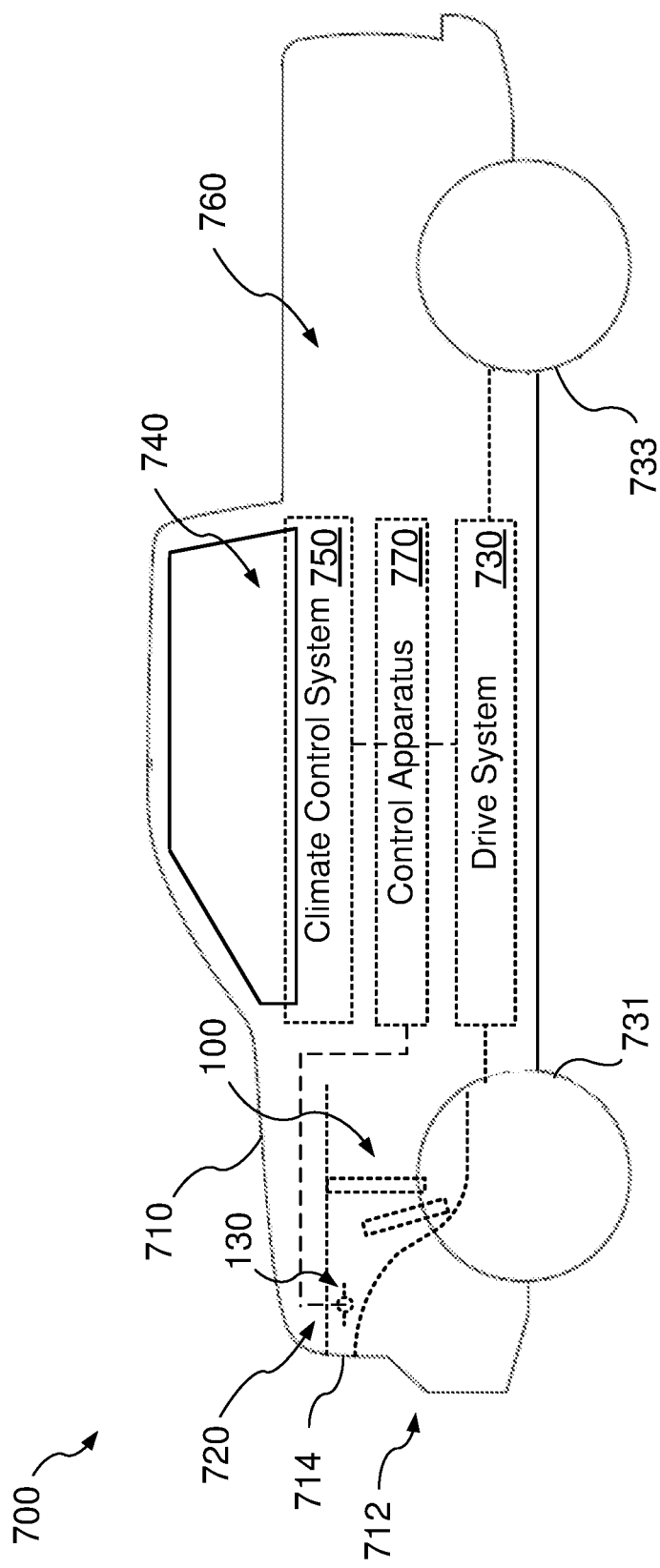
FIG. 7 is a side plan view in partial cutaway of a vehicle equipped with the apparatus of FIG. 1.

Referring additionally to FIG. 7, the apparatus 100 is disposed in a vehicle 700. The vehicle 700 includes a vehicle body 710. The vehicle body 710 includes an engine compartment 720 where, in various embodiments, the apparatus 100 is disposed. In various embodiments, the engine compartment 710 is at a front end 712 of the vehicle 700. In various embodiments, the front end 712 of the vehicle 700 includes a grill 714 that serves as the airflow source 116 (FIG. 1). As a result, when the vehicle 700 moves in a forward direction, the movement of the vehicle 700 results in the airflow 130 (FIG. 1) into the grill 714 where the apparatus 100 directs the airflow 130.

Referring additionally to FIG. 7, in various embodiments the vehicle body 710 includes a cabin 740 or other compartment to receive one or more occupants or cargo. The cabin 740 may be operably coupled with a climate control system 750, such as an air conditioning and heating system, to cool or heat the cabin 740 or other portions of the vehicle 700. The vehicle body 710 also may include a cargo area 760 separate from the cabin 740, such as a truck bed or a trunk. The vehicle 700 also includes a drive system 700 that operates in conjunction with one or more wheels 731 and 733 to motivate, accelerate, decelerate, stop, and steer the vehicle 700.

In various embodiments, the drive system 730 and/or the climate control system 750 are in communication with a control apparatus 770 that is operably coupled with the airflow controller 130. The control apparatus 770 may include a dedicated hardware system or include software executing on a computing device to provide a thermal management module that directs operation of the airflow controller 130, the one or more intake fans 118 (FIG. 1), and the one or more outlet fans 195 (FIG. 1) to provide for an appropriate airflow to each of the heat exchangers 140 and 160 based on input from various sensors associated with the drive system 730, climate control system 750, or other systems, as described further below. Based on data provided by the drive system 730 and the climate control system 750, the control apparatus 770 communicates with the airflow controller 130 (e.g., to adjust the orientation of the one or more control shutters 132, as previously described) to control how the airflow controller directs the airflow 130 over the first heat exchanger 140 and the second heat exchanger 160, as previously described, and/or to control the fans 118 and 195. In various embodiments, the control apparatus 770 directs movement of the one or more rotatable motors 132 (not shown in FIG. 7) that direct the one or more control shutters 132) to direct and allocate airflow.

Figure 8:
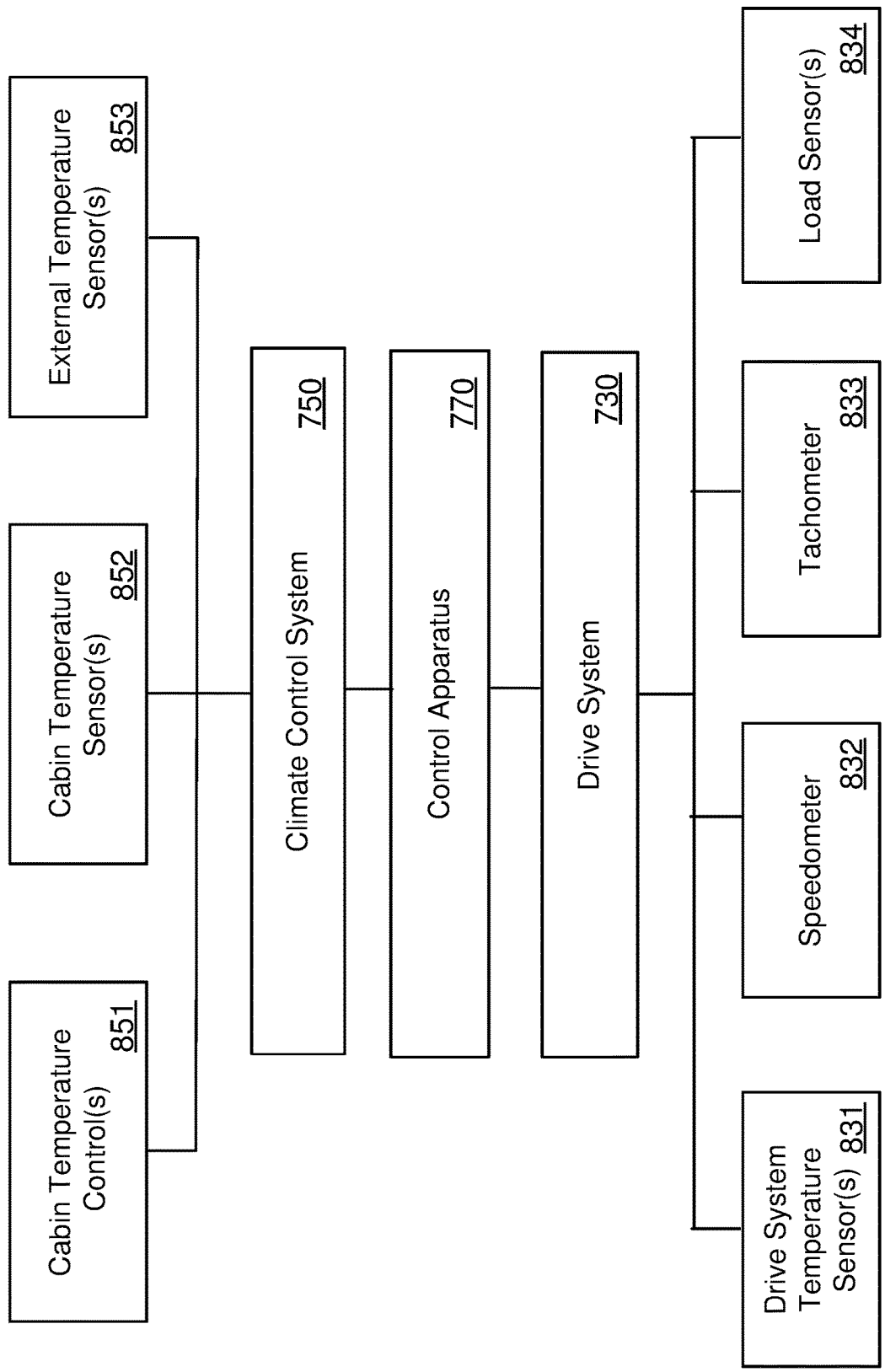
FIG. 8 is a block diagram of sensors providing data to the control apparatus of FIG. 7.

Referring additionally to FIG. 8, data received by the control apparatus 770 from the drive system 730 and the climate control system 750 may be based on inputs from a variety of sensors 831-834 associated with the drive system 730 and sensors 851-853 associated with the climate control system 750. The sensors 831-834 and 851-853 may provide data to the drive system 730 and the climate control system 750, respectively, which, in turn, provide the data to the control apparatus 770. Alternatively, some or all of the sensors 831-834 and 851-853 may provide the data directly to the control apparatus 770.

In various embodiments, the sensors 831-834 associated with the drive system 730 may include one or more drive system temperature sensors 832, a speedometer 834, a tachometer 836, and one or more load sensors 838, as well as additional sensors. Data on the temperature of and the demands on the drive system 730 facilitates the ability of the control apparatus 770 to assess cooling demands for heat exchangers associated with the drive system 730. The drive system temperature sensors 831 may include one or more temperature sensors to monitor the temperature of one or more heat exchangers associated with the drive system 730 or the coolant flowing through the one or more heat exchangers. The drive system temperature sensors 831 also may include sensors to monitor the temperature of an electric motor (in an electric or hybrid-powered vehicle), an engine (in an internal combustion or hybrid-powered vehicle), a battery system (in an electric-powered vehicle), a drive train, or other parts of the drive system 730. The drive system temperature sensors 831 thus provide data on the current cooling demands of the drive system 730.

In addition, data received from the speedometer 832, the tachometer 833, and/or load sensors 834 also provide data on current cooling demands of the drive system 730 as well as information about anticipated cooling demands of the drive system 730. For example, although the drive system temperature sensors 831 may indicate that the cooling demands of the drive system 730 are currently adequately served, an increase in speed, motor or engine rotations per minute (RPM), and other data received from the sensors 832-834 may indicate increasing or decreasing cooling demands for the drive system 730 relative to the demands indicated by the current temperature levels. This information is usable by the control apparatus 770 in directing the airflow controller 130 to allocate airflow to the one or more heat exchangers associated with the drive system 730 to keep pace with the increasing cooling demands.

In various embodiments, the climate control system 750 also may include or communicate with one or more cabin temperature controls 851, one or more cabin temperature sensors 852, and one or more external temperature sensors 853 configured to monitor temperature outside of the cabin.

The cabin temperature controls 851 may include one or more thermostats or fan controls that indicate a desired temperature level of the cabin that may be set by an operator of the vehicle or other occupants in one or more temperature zones. Settings of the cabin temperature controls 851 may be compared with data from the one or cabin temperature sensors 852 and external temperature sensors 853 to determine the cooling demands for one or more heat exchangers that may be associated with the climate control system 750. For example, a difference between the settings of the cabin temperature controls 851 and the cabin temperature sensors 852 may indicate current cooling demands of the one or more heat exchangers associated with the climate control system 750. In addition, data from the external temperature sensors 853 may be used to determine whether the cooling demands of the one or more heat exchangers associated with the climate control system 750 may be expected to increase with increasing external temperatures or decrease with decreasing external temperatures.

Receiving data from the sensors 831-834 associated with the drive system 730 and the sensors 851-853 associated with climate control system 750 allows the climate control apparatus 770 to determine the relative cooling demands of heat exchangers associated with the drive system 730 and the climate control system 750. For example, when the vehicle is driving fast, driving uphill, driving in demanding off-road conditions, and/or pulling a heavy load, the sensors 831-834 will indicate a relatively high demand for cooling of the one or more heat exchangers associated with the drive system 730. In such conditions, the control apparatus 770 may cause the airflow controller 130 (not shown in FIG. 8) to direct more airflow to the one or more heat exchangers associated with the drive system 730, as previously described with reference to FIG. 5. Correspondingly, when the vehicle is driving slowly or idling, coasting downhill, and/or is not heavily taxed, the sensors 831-834 will indicate a relatively low demand for cooling of the one or more heat exchangers associated with the drive system 730, potentially allowing the control apparatus 770 to cause the airflow controller 130 to direct more airflow to the one or more heat exchangers associated with the climate control system 750, as previously described with reference to FIG. 6.

It will be appreciated that the sensors 851-853 may similarly enable the control apparatus 770 to make determinations about directing airflow to the one or more heat exchangers associated with the climate control system 750 when the climate control system 750 is more heavily taxed than the drive system 730. For example, when the climate control system 750 is operating at a high level because of the cabin temperature sensors 852 indicate that the cabin temperature is considerably higher than the settings of the cabin temperature controls 851, the control apparatus 770 may cause the airflow controller 130 to direct more airflow to the one or more heat exchangers associated with the climate control system 750, as previously described with reference to FIG. 6. Conversely, when there are reduced or no cooling demands for the climate control system 750, the control apparatus 770 may direct the airflow controller to direct more airflow to the one or more heat exchangers associated with the drive system 730, as previously described with reference to FIG. 5.

When both the sensors 831-834 associated with the drive system 730 and the sensors 851-853 associated with the climate control system 750, in various embodiments, the control apparatus 770 may be configured to cause the airflow controller 130 to allocate the airflow to balance the cooling demands of each. It will be appreciated that cooling demands of the drive system 730 may be prioritized to avoid failure of or damage to the drive system 730 and its components. For example, allowing a battery system in an electrically-powered vehicle to overheat can result in long-term damage to the ability of the battery system to retain a charge. For another example, allowing an internal combustion engine to overheat can result in catastrophic damage or failure of the engine. Accordingly, in various embodiments, the control apparatus 770 may prioritize cooling demands of the drive system 730 and its one or more associated heat exchangers over the climate control system 750 and the comfort of the occupants. The control apparatus 770 may use data from the sensors 831-834 and 851-853 to calculate relative cooling demands and cause the airflow controller 130 to apportion the airflow accordingly. For example, the control apparatus 770 may determine or calculate drive cooling indices based on data from the sensors 831-834 associated with the drive system 730 and compare the drive cooling indices with climate control indices determined or calculated based on data from the sensors 851-853 associated with the climate control system 750. The indices may be weighted to prioritize the cooling demands of the drive system 730 to prevent damage to or failure of the drive system 730. In various embodiments, the allocation of airflow may be made based on a relative comparison of such indices, potentially subject to predetermined limits that, for example, will result in automatic prioritization of airflow to the drive system 730. To facilitate the determination or calculation of the relative cooling indices, the control apparatus 770 may include a computing device, as described below with reference to FIG. 9.

In addition, it will be appreciated that cooling demands of additional heat exchangers may be monitored and accounted for by the control apparatus 770. For example, if the vehicle includes a supercharger with one or more associated heat exchangers, the control apparatus 770 may be configured to cause the airflow controller 130 to allocate airflow to the additional one or more heat exchangers to balance cooling needs of the additional one or more heat exchangers with that of the heat exchangers associated with the drive system 730 and the climate control system 750. It will be appreciated that the positioning of the additional one or more heat exchangers will determine how the control apparatus 770 may direct the airflow controller 130 to direct the airflow.

Figure 9:
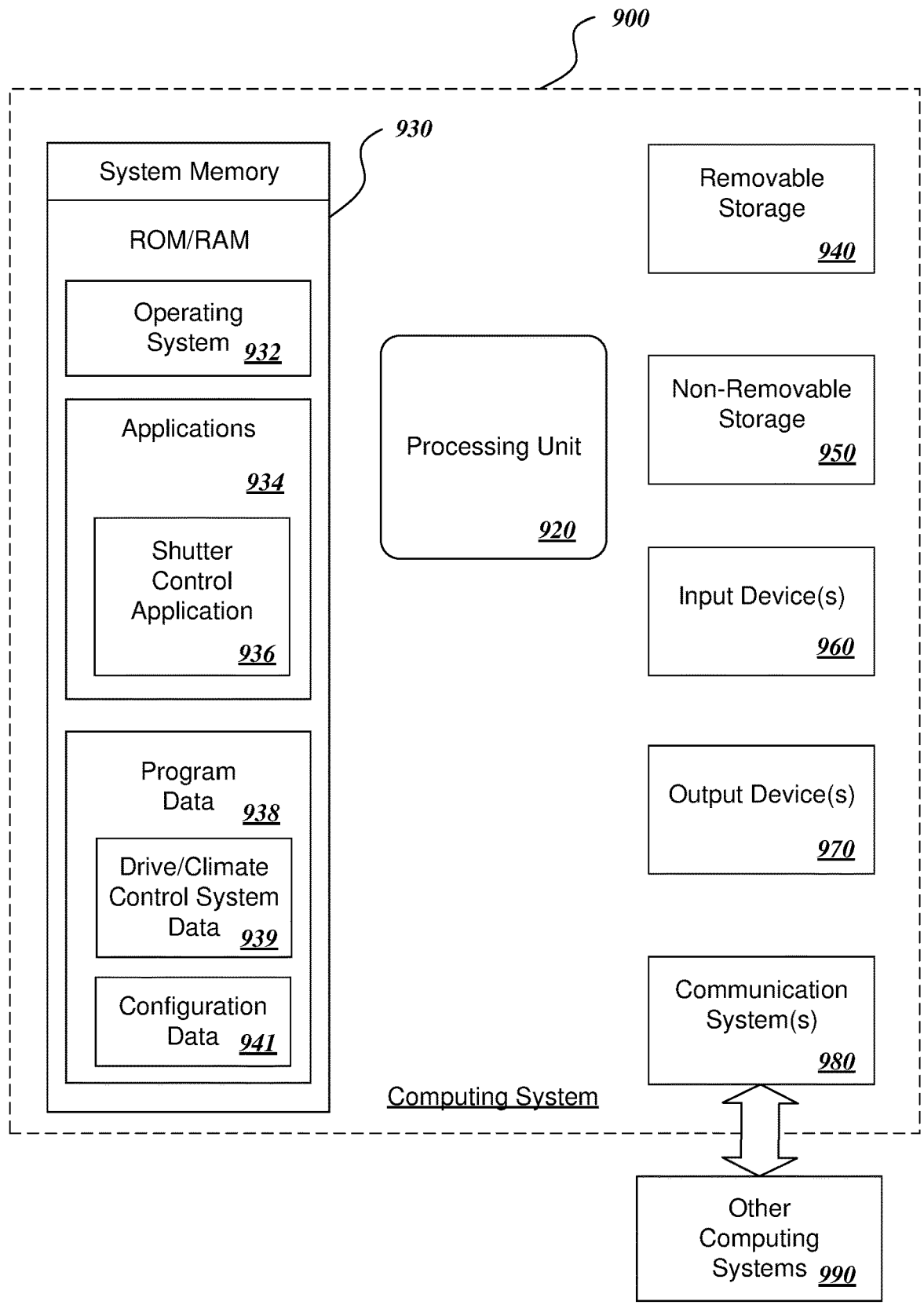
FIG. 9 is a block diagram of an illustrative computing system for operating the airflow controller of the apparatus of FIG. 1.

Referring additionally to FIG. 9, the control apparatus 770 may include a computing device 900 that is configured to manage operation of the airflow controller 130 (FIGS. 1 and 7). In various embodiments, the computing device 900 typically includes at least one processing unit 920 and a system memory 930. Depending on the exact configuration and type of computing device, the system memory 930 may be volatile memory, such as random-access memory ("RAM"), non-volatile memory, such as read-only memory ("ROM"), flash memory, and the like, or some combination of volatile memory and non-volatile memory. The system memory 930 typically maintains an operating system 932. The operating system 932 may include any number of operating systems executable on desktop or portable devices including, but not limited to, Linux, Microsoft Windows®, Apple OS®, or Android®, or a proprietary operating system. The system memory 930 also may include one or more applications 934. In various embodiments, the applications 934 will include a shutter control application 936. The system memory 930 also may include program data 938 that is accessible and used by the shutter control application 936. In various embodiments, the program data 938 may include drive and climate control system data 939 received from the drive system 330 and the climate control system 350 (FIG. 3) and configuration data 941 regarding response of the control shutter 160 to the drive and climate control system data 339.

The computing device 900 may also have additional features or functionality. For example, the computing device 900 may also include additional data storage devices (removable and/or non-removable) such as, for example, magnetic disks, optical disks, tape, or flash memory. Such additional storage is illustrated in FIG. 9 by removable storage 940 and non-removable storage 950. Computer storage media may include volatile and non-volatile, removable and non-removable media implemented in any method or technology for storage of information, such as computer-readable instructions, data structures, program modules or other data. The system memory 930, the removable storage 940, and the non-removable storage 950 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 900. Any such computer storage media may be part of the computing device 900.

The computing device 900 may also have input device(s) 960 such as a keyboard, stylus, voice input device, touch-screen input device, etc. Output device(s) 970 such as a display, speakers, short-range transceivers such as a Bluetooth transceiver, etc., may also be included. The computing device 900 also may include one or more communication systems 980 that allow the computing device 900 to communicate with other computing systems 990. As previously mentioned, the communication system 980 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

Figure 10:
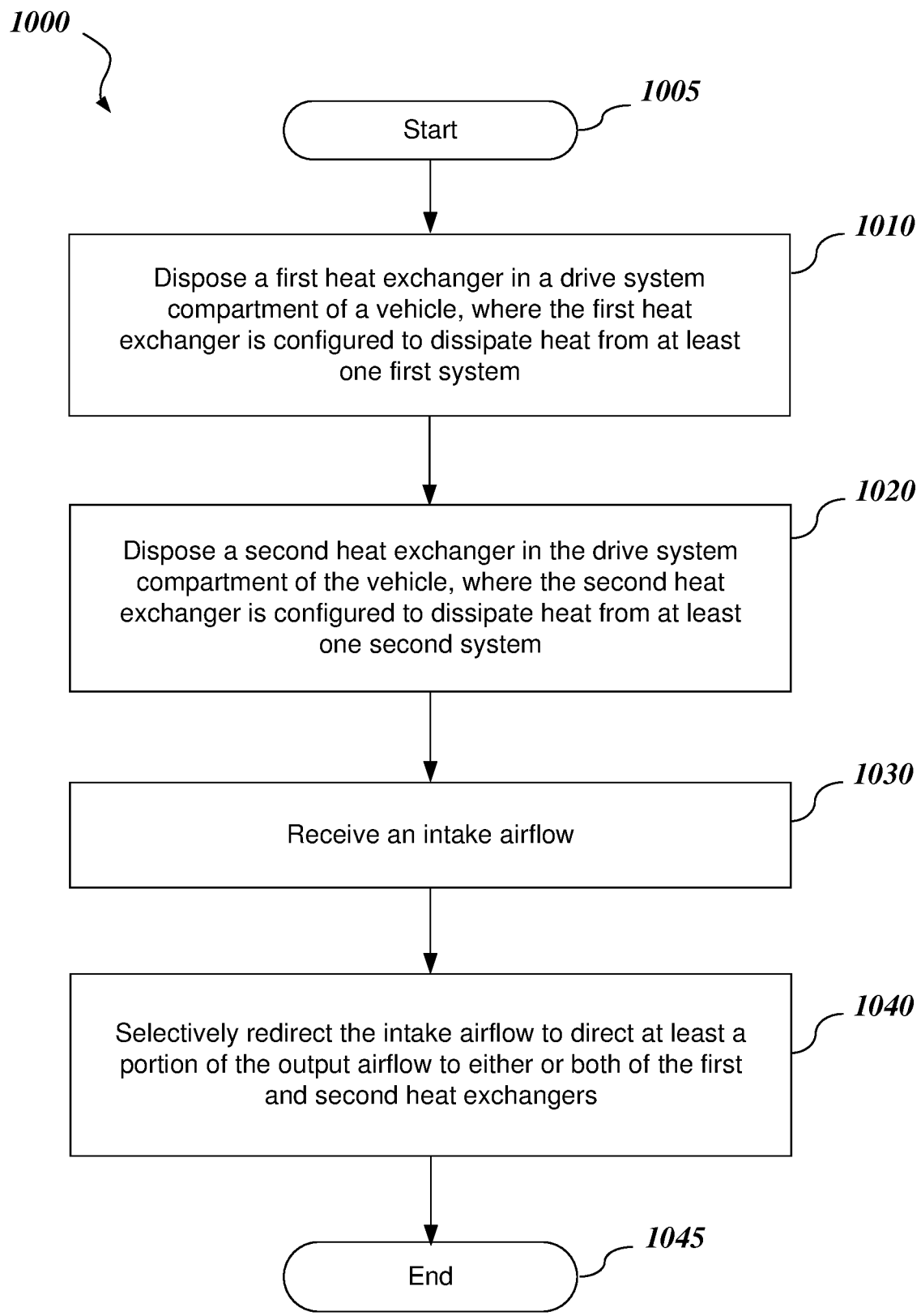
FIG. 10 is a flow chart of an illustrative method of providing an airflow controller for allocating airflow between heat exchangers.

Referring additionally to FIG. 10, an illustrative method 1000 of utilizing an airflow controller (e.g., with one or more rotatable control shutters) is provided. The method 1000 starts at a block 1005. At a block 1010, a first heat exchanger is disposed in a drive system compartment of a vehicle where the first heat exchanger is configured to dissipate heat from at least one first system. At a block 1020, a second heat exchanger is disposed in the drive system compartment of the vehicle where the second heat exchanger is configured to dissipate heat from at least one second system. At a block 1030, an intake airflow is received. At a block 1040, the intake airflow is selectively redirected to direct at least a portion of an output airflow to either or both of the first and second heat exchangers. The method 1000 ends at a block 1045.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. An apparatus comprising:
a first face of a first heat exchanger configured to dissipate heat from at least one first system, wherein the first heat exchanger is a first planar body;
a first face of a second heat exchanger configured to dissipate heat from at least one second system, wherein the second heat exchanger is a second planar body, wherein the first planar body is disposed at a splay angle relative to the second planar body; and
an airflow controller disposed between an airflow source and the first faces, wherein the airflow controller is configured to receive an intake airflow and direct an output airflow through the first face of the first heat exchanger and the first face of the second heat exchanger based on at least the airflow controller being rotated to a first angular position,
wherein the airflow controller is further configured to direct the output airflow around the first face of the first heat exchanger and through the first face of the second heat exchanger based on at least the airflow controller being rotated to a second angular position.

2. The apparatus of claim 1, further comprising at least one fan configured to receive the intake airflow and to direct the intake airflow toward the airflow controller, wherein the at least one fan is configured to direct the intake airflow when a flow rate of the intake airflow is less than a threshold rate.

3. The apparatus of claim 1, further comprising a seal disposed between the first planar body and the second planar body at a vertex of the splay angle.

4. The apparatus of claim 1, wherein the airflow controller includes at least one rotatable control shutter configured to rotate selectively redirect the intake airflow as the output airflow between the first faces of the first and second heat exchangers.

5. The apparatus of claim 4, wherein the at least one rotatable control shutter is rotatable within a range of one-hundred and eighty degrees.

6. The apparatus of claim 4, further comprising a rotatable shutter mount configured to adjust rotation of the at least one rotatable control shutter and a rotation controller coupled with the rotatable shutter mount to automatically adjust the rotation of the at least one rotatable control shutter in response to at least one detected condition of the first and second heat exchangers.

7. The apparatus of claim 1, wherein the first and second heat exchangers are disposed within a compartment and at least one edge of one of the first and second heat exchangers is sealed relative to at least one side of the compartment to compel a portion of the output airflow directed to the first face of the first heat exchanger to flow through both the first face of the first heat exchanger and the first face of the second heat exchanger.

8. The apparatus of claim 1, wherein the second heat exchanger is disposed in a linear offset relative to the first heat exchanger to provide for an unobstructed portion of the output airflow reaching the first face of the second heat exchanger without first passing through the first face of the first heat exchanger.

9. The apparatus of claim 1, wherein the second heat exchanger includes at least one dimension chosen from a height and a width that is larger than a corresponding dimension of the first heat exchanger to provide for an unobstructed portion of the output airflow reaching the first face of the second heat exchanger without first passing through the first face of the first heat exchanger.

10. A vehicle comprising:
a vehicle body;
a cabin incorporated in the vehicle body;
a drive system supported by the vehicle body and configured to control one or more wheels of the vehicle;
a drive system compartment incorporated in the vehicle body; and
a heat exchange system disposed in the drive system compartment including:
a first face of a first heat exchanger configured to dissipate heat from at least one first system, wherein the first heat exchanger is a first planar body;
a first face of a second heat exchanger configured to dissipate heat from at least one second system, wherein the second heat exchanger is a second planar body, wherein the first planar body is disposed at a splay angle relative to the second planar body;
an airflow controller disposed between an airflow source and the first faces, wherein the airflow controller is configured to receive an intake airflow and direct an output airflow through the first face of the first heat exchanger and the first face of the second heat exchanger based on at least the airflow controller being rotated to a first angular position,
wherein the airflow controller is further configured to direct the output airflow around the first face of the first heat exchanger and through the first face of the second heat exchanger based on at least the airflow controller being rotated to a second angular position.

11. The vehicle of claim 10, further comprising at least one fan configured to receive the intake airflow and to motivate the intake airflow toward the airflow controller, wherein the at least one fan is configured to motivate the intake airflow when a flow rate of the intake airflow is less than a threshold rate.

12. The vehicle of claim 10, wherein the heat exchange system further comprises a seal disposed between the first planar body and the second planar body at a vertex of the splay angle.

13. The vehicle of claim 10, wherein the airflow controller includes at least one rotatable control shutter configured to rotate selectively redirect the intake airflow as the output airflow between the first faces of the first and second heat exchangers.

14. The vehicle of claim 13, further comprising a rotatable shutter mount configured to adjust rotation of the at least one rotatable control shutter and a rotation controller coupled with the rotatable shutter mount to automatically adjust the rotation of the at least one rotatable control shutter in response to at least one detected condition of the first and second heat exchangers.

15. The vehicle of claim 10, wherein the airflow controller is configured to direct the output airflow into at least one flow pattern chosen from a first airflow directed to at least partially bypass the first face of the second heat exchanger and a second airflow directed to at least partially bypass the first face of the first heat exchanger.

16. The vehicle of claim 10, wherein at least one of the first and second heat exchangers includes one of a radiator and a condenser.

17. The vehicle of claim 10, wherein at least one configuration of the first heat exchanger and the second heat exchanger includes:
   the second heat exchanger being disposed in a linear offset relative to the first heat exchanger to provide for a portion of the output airflow reaching the first face of the second heat exchanger without first passing through the first face of the first heat exchanger; and
   the second heat exchanger includes at least one dimension chosen from a height and a width that is larger than a corresponding dimension of the first heat exchanger to provide for the portion of the output airflow reaching the first face of the second heat exchanger without first passing through the first face of the first heat exchanger.

18. A method comprising:
   disposing a first heat exchanger in a drive system compartment of a vehicle, wherein the first heat exchanger has a first face and is configured to dissipate heat from at least one first system, wherein the first heat exchanger is a first planar body;
   disposing a second heat exchanger in the drive system compartment of the vehicle, wherein the second heat exchanger has a first face and is configured to dissipate heat from at least one second system, wherein the second heat exchanger is a second planar body, wherein the first planar body is disposed at a splay angle relative to the second planar body;
   receiving an intake airflow; and
   selectively redirecting the intake airflow as an output airflow through the first face of the first heat exchanger and the first face of the second heat exchanger by rotating an airflow controller disposed between an airflow source and the first faces to a first angular position and around the first face of the first heat exchanger and through the first face of the second heat exchanger by rotating the airflow controller to a second angular position.

19. The method of claim 18, further comprising selectively redirecting the intake airflow with at least one rotatable control shutter.

20. The method of claim 18, further comprising disposing the second heat exchanger in a linear offset relative to the first heat exchanger to provide for a portion of the output airflow reaching the second heat exchanger without first passing through the first heat exchanger.

21. The apparatus of claim 1, wherein the airflow controller is further configured to direct the output airflow directly through the first face of the second heat exchanger based on at least the airflow controller being rotated to a third angular position.

22. The vehicle of claim 10, wherein the airflow controller is further configured to direct the output airflow directly through the first face of the second heat exchanger based on at least the airflow controller being rotated to a third angular position.

23. The method of claim 18, further comprising selectively redirecting the intake airflow as the output airflow directly through the first face of the second heat exchanger by rotating the airflow controller to a third angular position.

* * * * *